United States Patent
Hamamoto et al.

(10) Patent No.: US 12,187,151 B2
(45) Date of Patent: *Jan. 7, 2025

(54) AUTHENTICATION METHOD FOR POWER STORAGE PACK, POWER STORAGE PACK, CHARGING DEVICE, ELECTRIC MOVING BODY, AND CONTROL DEVICE FOR ELECTRIC MOVING BODY

(71) Applicant: Panasonic Intellectual Property Management Co., Ltd., Osaka (JP)

(72) Inventors: Katsuaki Hamamoto, Osaka (JP); Masaaki Kuranuki, Kyoto (JP); Ryosuke Nagase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

This patent is subject to a terminal disclaimer.

(21) Appl. No.: 17/758,587

(22) PCT Filed: Dec. 28, 2020

(86) PCT No.: PCT/JP2020/049226
§ 371 (c)(1),
(2) Date: Jul. 11, 2022

(87) PCT Pub. No.: WO2021/149467
PCT Pub. Date: Jul. 29, 2021

(65) Prior Publication Data
US 2023/0046158 A1    Feb. 16, 2023

(30) Foreign Application Priority Data

Jan. 23, 2020  (JP) ................. 2020-009033

(51) Int. Cl.
*H02J 7/00*  (2006.01)
*B60L 53/65*  (2019.01)
(Continued)

(52) U.S. Cl.
CPC ............... *B60L 53/65* (2019.02); *B60L 53/66* (2019.02); *B60L 53/80* (2019.02)

(58) Field of Classification Search
CPC .......... B60L 53/65; B60L 53/66; B60L 53/80; B60L 53/30
See application file for complete search history.

(56) References Cited

U.S. PATENT DOCUMENTS 11,545,829 B2 * 1/2023 Kawamura .......... G01R 21/133
2011/0241824 A1 * 10/2011 Uesugi ................ H02J 7/0047
320/109

(Continued)

FOREIGN PATENT DOCUMENTS

JP    2011-125186    6/2011

OTHER PUBLICATIONS

International Search Report of PCT application No. PCT/JP2020/049226 dated Mar. 16, 2021.

*Primary Examiner* — Jared Fureman
*Assistant Examiner* — Esayas G Yeshaw
(74) *Attorney, Agent, or Firm* — Rimon P.C.

(57) ABSTRACT

A charging device wiredly transmits identification information to a power storage pack after the power storage pack is mounted. The power storage pack transmits via near-field communication a signal including the identification information received from the charging device. The charging device collates whether or not the identification information included in the received signal matches the identification information wiredly transmitted.

21 Claims, 15 Drawing Sheets

(51) Int. Cl.
*B60L 53/66* (2019.01)
*B60L 53/80* (2019.01)

(56) References Cited

U.S. PATENT DOCUMENTS

| | | | | |
|---|---|---|---|---|
| 2012/0049785 | A1* | 3/2012 | Tanaka | B60L 53/305 |
| | | | | 320/106 |
| 2021/0037407 | A1* | 2/2021 | Park | H01M 10/4207 |
| 2022/0305945 | A1* | 9/2022 | Dooley | B60L 53/67 |
| 2022/0340039 | A1* | 10/2022 | Unagami | B60L 53/66 |

\* cited by examiner

AUTHENTICATION METHOD FOR POWER STORAGE PACK, POWER STORAGE PACK, CHARGING DEVICE, ELECTRIC MOVING BODY, AND CONTROL DEVICE FOR ELECTRIC MOVING BODY

CROSS-REFERENCE TO RELATED APPLICATIONS

This application is a U.S. national stage application of the PCT International Application No. PCT/JP2020/049226 filed on Dec. 28, 2020, which claims the benefit of foreign priority of Japanese patent application No. 2020-009033 filed on Jan. 23, 2020, the contents all of which are incorporated herein by reference.

TECHNICAL FIELD

The present invention relates to a method of authenticating a power storage pack mounted in and detached from an electric movable body, a power storage pack, a charging device, an electric movable body, and a controller for an electric movable body.

BACKGROUND ART

In recent years, electric motorcycles (electric scooters) and electric bicycles have become widespread. Usually, a portable battery pack capable of being mounted and unmounted is used in the electric motorcycle or the electric bicycle. When a battery is used as a power source of the motorcycle (scooter), a time required for energy supply is longer than a case where a liquid fuel such as gasoline is used (a charging time is longer than a fueling time).

Thus, when a state of charge of the battery pack decreases, it is considered that a mechanism for shortening the time required for energy supply is constructed by replacing a battery pack charged in advance with a battery pack having a reduced state of charge at the nearest charging stand.

Meanwhile, a method for confirming connection between a vehicle having an electricity storage device mounted thereon and an external power supply device by using wireless communication when the vehicle and the external power supply device are connected by a charging cable has been proposed (see, for example, PTL 1).

CITATION LIST

Patent Literature

PTL 1: Japanese Patent Laid-Open Publication No. 2011-125186

SUMMARY OF THE INVENTION

Technical Problem

In the above method, it is assumed that the electricity storage device is fixed in the vehicle, and it is not assumed that the electricity storage device is removed from the vehicle. On the other hand, in the above mechanism involving the replacement of the battery pack, a circumstance in which there are a plurality of vehicles or a plurality of chargers in a range in which wireless communication with the battery pack can be performed may occur.

Under such a circumstance, there is a possibility that a controller of a certain vehicle erroneously controls a battery pack mounted in another adjacent vehicle. There is a possibility that a controller of the charger does not control the battery pack which is to be controlled and is mounted in a certain charging slot and erroneously controls the battery pack which is not to be controlled and is mounted in another charging slot. In such a case, safety and security of the entire charging system cannot be secured.

The present disclosure has been made in view of such a circumstance, and an object of the present disclosure is to provide a technique for correctly identifying a mounted power storage pack by an electric movable body or a charging device that controls the power storage pack by using wireless communication.

Solution to Problem

In order to solve the problems, a power storage pack authentication method according to an aspect of the present disclosure includes: wiredly transmitting, by a controller of a charging device, identification information to a controller of a power storage pack mounted in a charging slot of the charging device after the power storage pack detached from an electric movable body is mounted in the charging slot; transmitting via near-field communication, by the controller of the power storage pack, a signal including the identification information received from the charging device; and after the controller of the charging device receives the signal transmitted via the near-field communication, collating, by the controller of the charging device, whether or not the identification information included in the received signal matches the identification information transmitted wiredly, and authenticate that the power storage pack mounted in the charging slot is identical to a partner device communicating via the near-field communication when the identification information included in the received signal matches the identification information wiredly transmitted.

Advantageous Effect of Invention

According to the present disclosure, the electric movable body or the charging device that controls the power storage pack by using wireless communication correctly identify the mounted power storage pack.

DESCRIPTION OF EMBODIMENT

Figure 1:
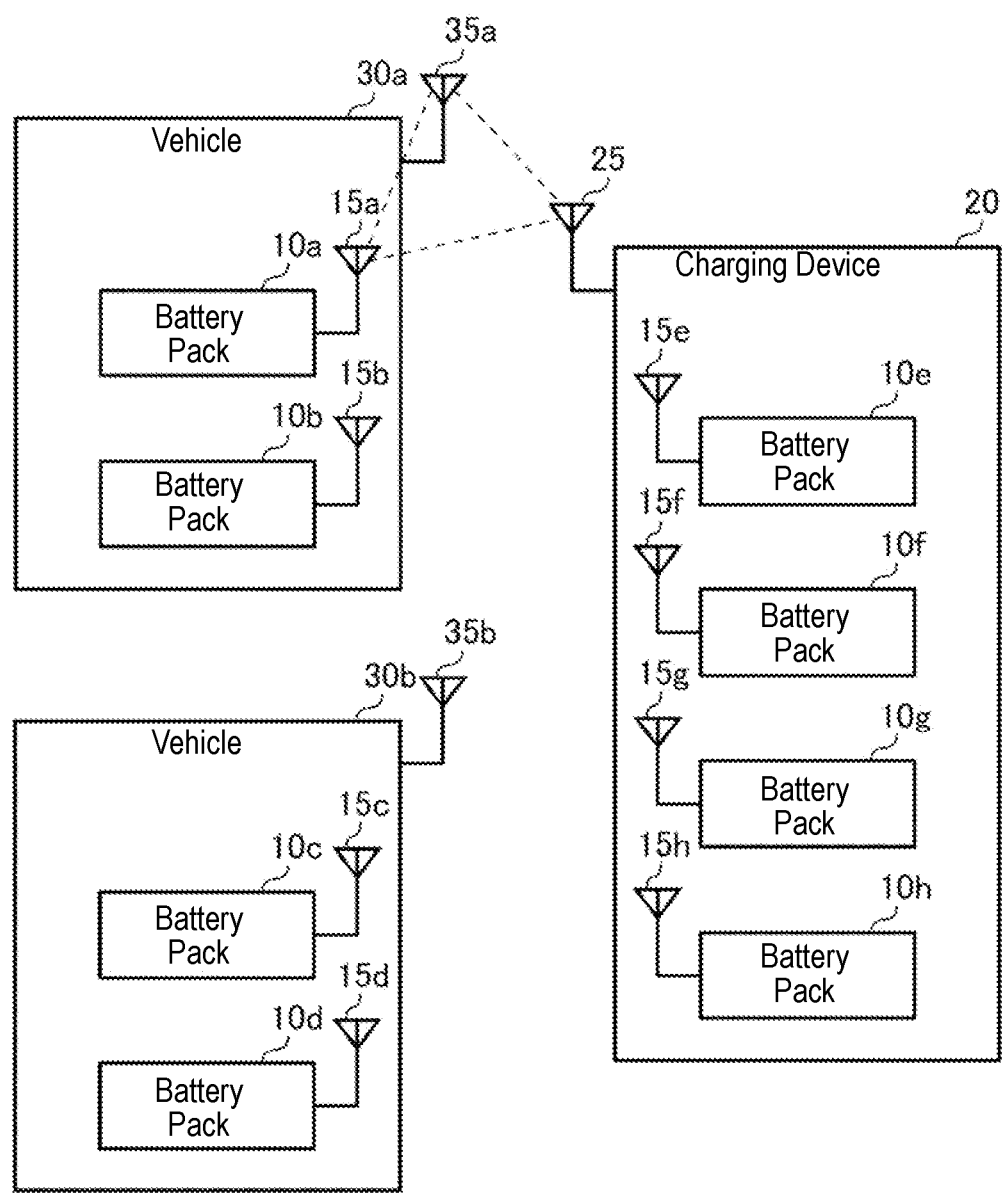
FIG. 1 is a conceptual diagram of a vehicle system using a replaceable battery pack according to an exemplary embodiment.

FIG. 1 is a conceptual diagram of vehicle system 1 using replaceable battery pack 10 according to an exemplary embodiment. Vehicle system 1 includes plural battery packs 10, at least one charging device 20, and plural vehicles 30 are used. In the present exemplary embodiment, an electric motorcycle (electric scooter) is assumed as vehicle 30.

Battery pack 10 is a portable or replaceable battery pack capable of being mounted and detached, and can be mounted in a mounting slot of vehicle 30 and a charging slot of charging device 20. Battery pack 10 is charged while being mounted in the charging slot of charging device 20. Charged battery pack 10 is taken out by a user (usually, a driver of vehicle 30) and is mounted in the mounting slot of vehicle 30. Battery pack 10 mounted in the mounting slot of vehicle 30 is discharged during traveling of vehicle 30, and has a state of charge reduced accordingly. Battery pack 10 having the reduced state of charge is taken out by the user and is mounted in the charging slot of charging device 20. The user takes out charged battery pack 10 from another charging slot of charging device 20 and mounts the charged battery pack in the mounting slot of vehicle 30. Battery pack 10 having the reduced state of charge is thus replaced with charged battery pack 10. As a result, the user does not need to wait for the charging of battery pack 10, and can restart the traveling of vehicle 30 in a short time.

In this method, since battery pack 10 is frequently mounted and detached, deterioration of a connector of battery pack 10 contacting a connector of the mounting slot of vehicle 30 or a connector of the charging slot of charging device 20 easily progresses. As a countermeasure, in the present exemplary embodiment, a control signal is transmitted and received between battery pack 10 and each of vehicle 30 and charging device 20 by wireless communication. As a result, a terminal for a communication line can be eliminated from a connector. A terminal for a power line may be provided in the connector. In the present exemplary embodiment, since wired communication via the connector is not used for the transmission and reception of the control signal, the control signal is prevented from being interrupted due to a connector defect.

Near-field communication is used for wireless communication between vehicle 30 and battery pack 10, wireless communication between charging device 20 and battery pack 10, and wireless communication between vehicle 30 and charging device 20. Bluetooth®, Wi-Fi®, infrared communication, and the like may be used as the near-field communication. Hereinafter, in the present exemplary embodiment, it is assumed that Bluetooth Low Energy (BLE) is used as the near-field communication.

The BLE is an extended standard of Bluetooth®, and is a low-power-consumption near-field communication standard using a 2.4 GHz band. Since the BLE has low power consumption such that the battery pack may be powered for several years with a single button cell, the battery pack is suitable for battery powering, and the influence on the state of charge of battery pack 10 may be almost ignored. Since a lot of modules for BLE communication are put in the market, the modules may be obtained at low cost. The BLE has high affinity with a smartphone, and can provide various services in cooperation with the smartphone.

When a general class II device is used, a radio wave coverage of the BLE is about 10 m. Therefore, plural vehicles 30, plural battery packs 10, and charging devices 20 may exist within a communication range of the BLE. Since the plural charging slots are provided in charging device 20, charging device 20 needs to wirelessly communicate with plural battery packs 10 mounted in plural charging slots. That is, a 1:N network is established between charging device 20 and each of plural battery packs 10. Similarly, in the case that plural mounting slots are provided in vehicle 30, vehicle 30 needs to wirelessly communicate with plural battery packs 10 mounted in the plural mounting slots. That is, a 1:N network is established between vehicle 30 and each of the plural battery packs 10.

Therefore, a mechanism for ensuring that battery pack 10 mounted in a specific charging slot of charging device 20 is required to be identical to battery pack 10 of a specific communication partner device of charging device 20. Similarly, a mechanism for ensuring that battery pack 10 mounted in a specific mounting slot of vehicle 30 is required to be identical to battery pack 10 of a specific communication partner device of vehicle 30. In the present exemplary embodiment, the identity between battery pack 10 physically connected and battery pack 10 connected by wireless communication is confirmed by identification information (ID). The identification information (ID) may be temporal identification information. The identification information (ID) may include identification information unique to each device.

Figure 2:
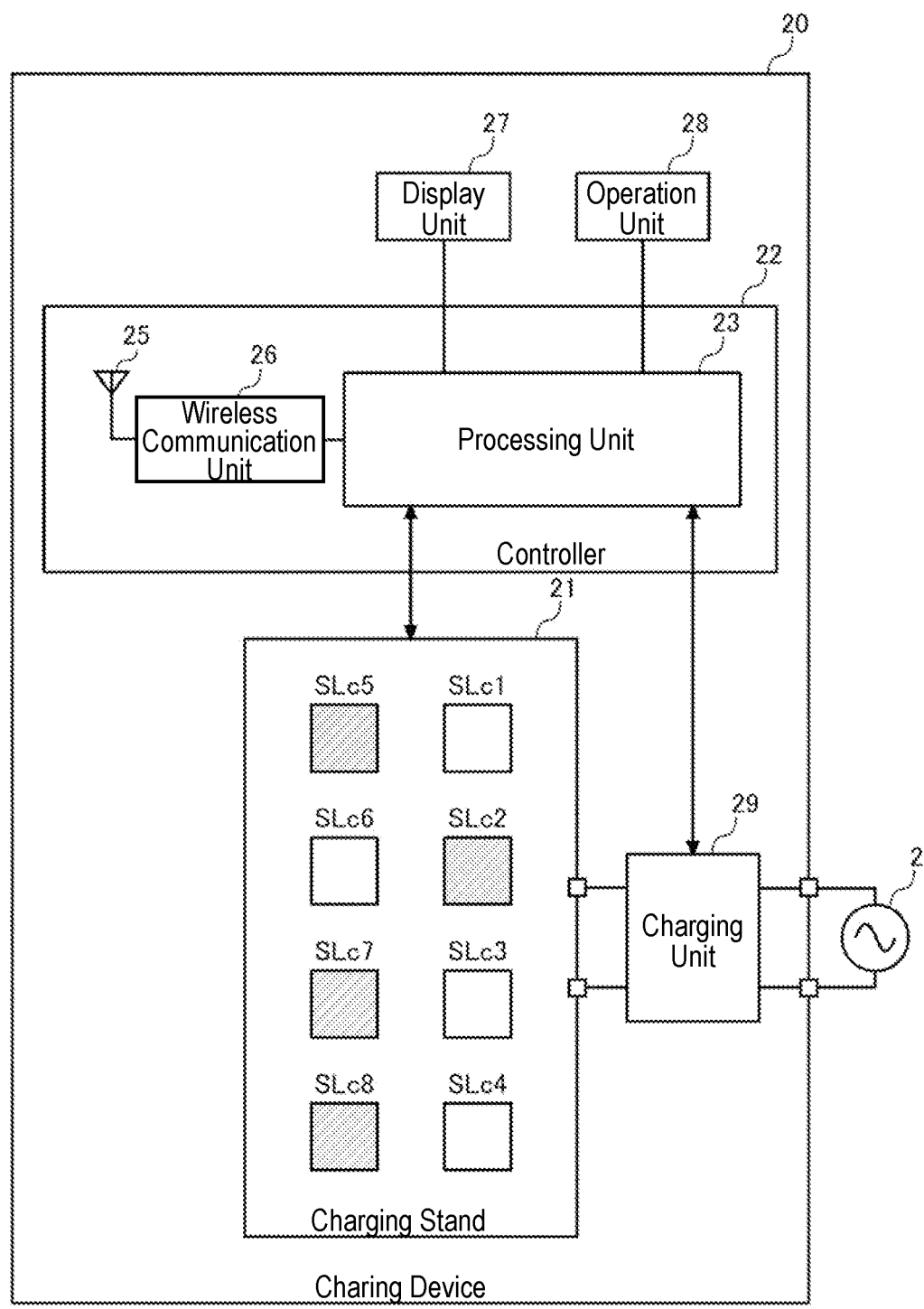
FIG. 2 is a diagram illustrating a configuration example of a charging device according to the exemplary embodiment.

FIG. 2 is a diagram illustrating a configuration example of charging device 20 according to the exemplary embodiment. Charging device 20 includes charging stand 21, controller 22, display unit 27, operation unit 28, and charging unit 29. Controller 22 includes at least processing unit 23, antenna 25, and wireless communication unit 26.

Charging stand 21 has plural charging slots SLc1 to SLc8 in which plural battery packs 10 are mounted, respectively. In the example illustrated in FIG. 2, the number of charging slots is eight. The number of charging slots may be two or more, and may be four, for example.

Each of charging slots SLc1 to SLc8 includes a connector including a positive electrode terminal and a negative electrode terminal. When battery pack 10 is mounted, the charging slots are electrically conducted to a positive electrode terminal and a negative electrode terminal included in the connector of battery pack 10, respectively. The negative electrode terminal included in the connector of each of charging slots SLc1 to SLc8 and the negative electrode terminal included in the connector of battery pack 10 may be solid grounds. In this case, pins included in the connector of battery pack 10 may be integrated with one of positive electrode terminal pins, and the number of projection portions of the connector with defect may be reduced.

Processing unit 13 (see FIG. 4) of each battery pack 10 mounted in charging stand 21 transmits and receives a control signal to and from processing unit 23 in controller 22 via the near-field communication and a power line. A specific method for transmitting and receiving the control signal between the processing units will be described later.

The positive electrode terminal and the negative electrode terminal of each of charging slots SLc1 to SLc8 are connected to a positive electrode terminal and a negative electrode terminal of charging unit 29, respectively. Charging unit 29 is connected to commercial power system 2, and is configured to charge battery pack 10 mounted in charging stand 21. Charging unit 29 generates direct-current (DC) power by performing full-wave rectifying of alternating-current (AC) power supplied from commercial power system 2 and smoothing the rectified AC power with a filter.

Relays (not illustrated) are provided between the positive electrode terminal and the negative electrode terminal of charging unit 29 and the positive electrode terminal and the negative electrode terminal of each of charging slots SLc1 to SLc8. Processing unit 23 controls control conduction or interruption of each of charging slots SLc1 to SLc8 by controlling turning on (closing) and turning off (opening) of each relay.

A DC/DC converter (not illustrated) may be provided between the positive electrode terminal and the negative electrode terminal of charging unit 29 and the positive electrode terminal and the negative electrode terminal of each of charging slots SLc1 to SLc8. In this case, processing unit 23 controls a charging voltage or a charging current of each battery pack 10 by controlling the DC/DC converter. For example, constant current (CC) charging or constant voltage (CV) charging can be performed. The DC/DC converter may be provided in battery pack 10. When an AC/DC converter is mounted in battery pack 10, battery pack 10 may be charged with AC power from charging unit 29.

Processing unit 23 is, for example, a microcomputer. Wireless communication unit 26 executes a near-field communication process. In the present exemplary embodiment, wireless communication unit 26 includes a BLE module, and antenna 25 includes a chip antenna built in the BLE module or a pattern antenna. Wireless communication unit 26 outputs data received via near-field communication to processing unit 23, and transmits data input from processing unit 23 via near-field communication.

Processing unit 23 may acquire battery state information from battery pack 10 mounted in charging stand 21. At least one of voltage, current, temperature, state of charge (SOC), and state of health (SOH) of plural cells E1 to En (see FIG. 4) in battery pack 10 can be acquired as the battery state information.

Display unit 27 includes a display, and displays guidance to the user (usually, the driver of vehicle 30) who uses charging device 20 on the display. Operation unit 28 is a user interface such as a touch panel, and accepts an operation from the user. Charging device 20 may further include a loudspeaker (not illustrated) and may output audio guidance from the loudspeaker to the user.

Figure 3:
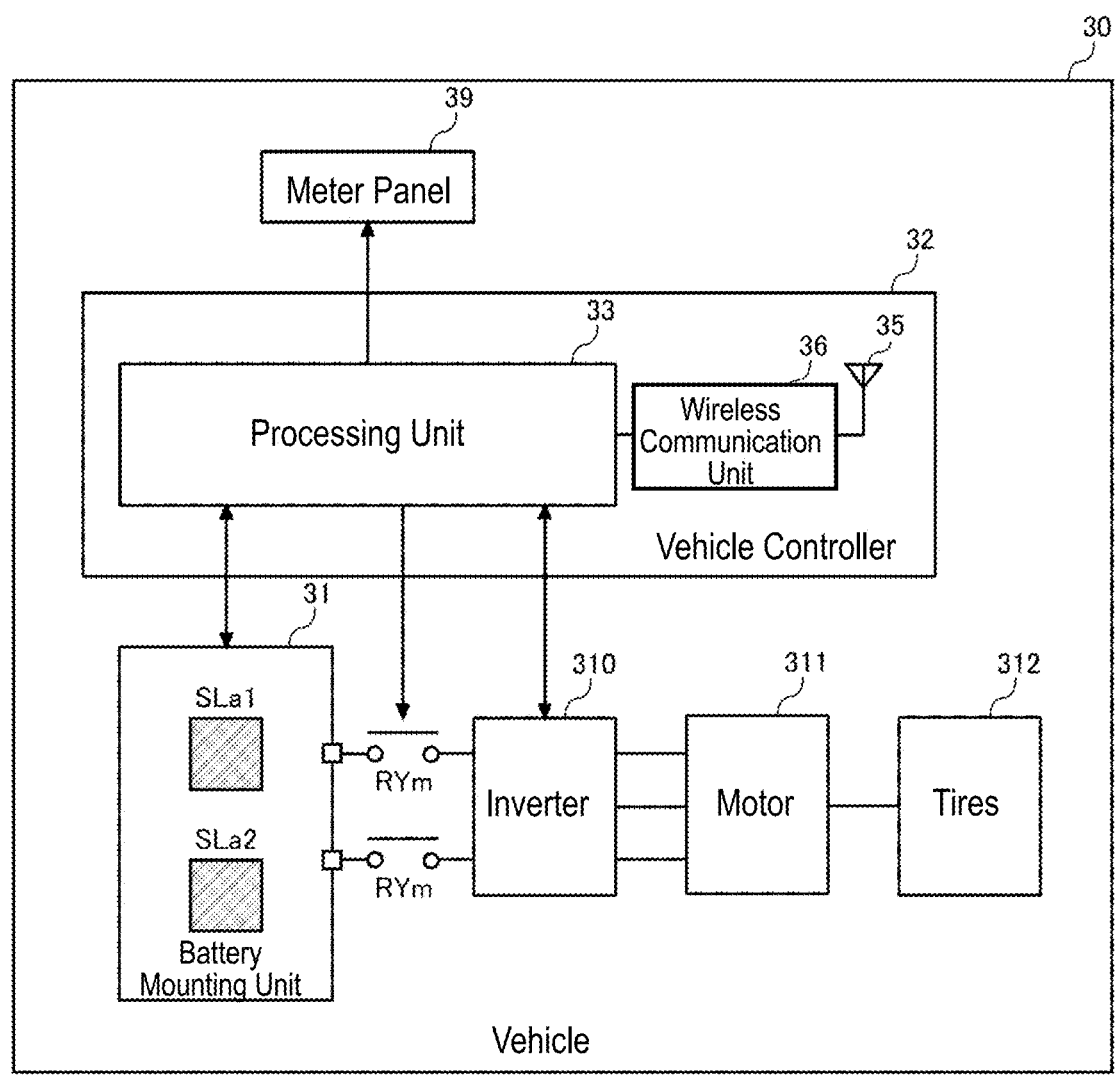
FIG. 3 is a diagram illustrating a configuration example of a vehicle according to the exemplary embodiment.

FIG. 3 is a diagram illustrating a configuration example of vehicle 30 according to the exemplary embodiment. Vehicle 30 includes battery mounting unit 31, vehicle controller 32, meter panel 39, inverter 310, motor 311, and tire 312. Vehicle controller 32 includes at least processing unit 33, antenna 35, and wireless communication unit 36.

Battery mounting unit 31 has at least one of mounting slots SLa1 and SLa2 for mounting at least one battery pack 10. In the example illustrated in FIG. 3, although the number of mounting slots is two, the number of mounting slots may be one or three or more.

Each of mounting slots SLa1 and SLa2 includes a connector including a positive electrode terminal and a negative electrode terminal, and when battery pack 10 is mounted, the mounting slots are electrically conducted to the positive electrode terminal and the negative electrode terminal included in the connector of battery pack 10, respectively. The negative electrode terminal portion included in the connector of each of mounting slots SLa1 and SLa2 may be a solid GND.

Processing unit 13 (see FIG. 4) of each battery pack 10 mounted in battery mounting unit 31 transmits and receives a control signal to and from processing unit 33 in vehicle controller 32 via near-field communication and a power line. A specific method for transmitting and receiving the control signal between the processing units will be described later.

The plural positive electrode terminals of the plural mounting slots SLa1 and SLa2 are connected to a positive-side power bus, and the plural negative electrode terminals are connected to a negative-side power bus. Therefore, the plural battery packs 10 mounted in the plural mounting slots SLa1 and SLa2 are electrically connected in parallel to one another. Therefore, as the number of battery packs 10 mounted in battery mounting unit 31 increases, the capacity increases. The plural battery packs 10 mounted in the plural mounting slots SLa1 and SLa2 may be electrically connected in series to one another. In this case, an output voltage is increased.

A positive electrode terminal and a negative electrode terminal of battery mounting unit 31 are connected to a positive electrode terminal and a negative electrode terminal of inverter 310, respectively, via main relay RYm. Main relay RYm functions as a contactor between vehicle 30 and battery pack 10. Processing unit 33 controls conduction or interruption between vehicle 30 and battery pack 10 by controlling turning on and off of main relay RYm.

Inverter 310 converts DC power supplied from battery pack 10 mounted in battery mounting unit 31 into AC power and supplies the AC power to motor 311 at the time of power running. The inverter converts AC power supplied from motor 311 into DC power and supplies the DC power to battery pack 10 mounted in battery mounting unit 31 at the time of regeneration. Motor 311 is a three-phase AC motor, and rotates in accordance with the AC power supplied from inverter 310 at the time of power running. At the time of regeneration, the motor converts rotational energy created by deceleration into AC power and supplies the AC power to inverter 310. A rotary shaft of motor 311 is coupled to a rotary shaft of tire 312 of a rear wheel. A transmission may be provided between the rotary shaft of motor 311 and the rotary shaft of tire 312.

Vehicle controller 32 is a vehicle electronic controller (ECU) configured to control entire vehicle 30. Processing unit 33 of vehicle controller 32 includes a microcomputer. Wireless communication unit 36 executes a near-field communication process. In the present exemplary embodiment, wireless communication unit 36 includes a BLE module, and antenna 35 includes a chip antenna built in the BLE module or a pattern antenna. Wireless communication unit 36 outputs data received via near-field communication to processing unit 33, and transmits data input from processing unit 33 via the near-field communication.

Processing unit 33 may acquire battery state information from battery pack 10 mounted in battery mounting unit 31. Information of at least one of voltage, current, temperature, SOC, and SOH of plural cells E1 to En (see FIG. 4) in battery pack 10 can be acquired as the battery state information. Processing unit 33 may acquire a speed of vehicle 30.

Meter panel 39 displays state information of vehicle 30. For example, the speed of vehicle 30 and the state of charge (SOC) of battery pack 10 are displayed. The driver may determine the necessity of replacement of battery pack 10 by looking at the state of charge (SOC) of battery pack 10 displayed on meter panel 39.

Figure 4:
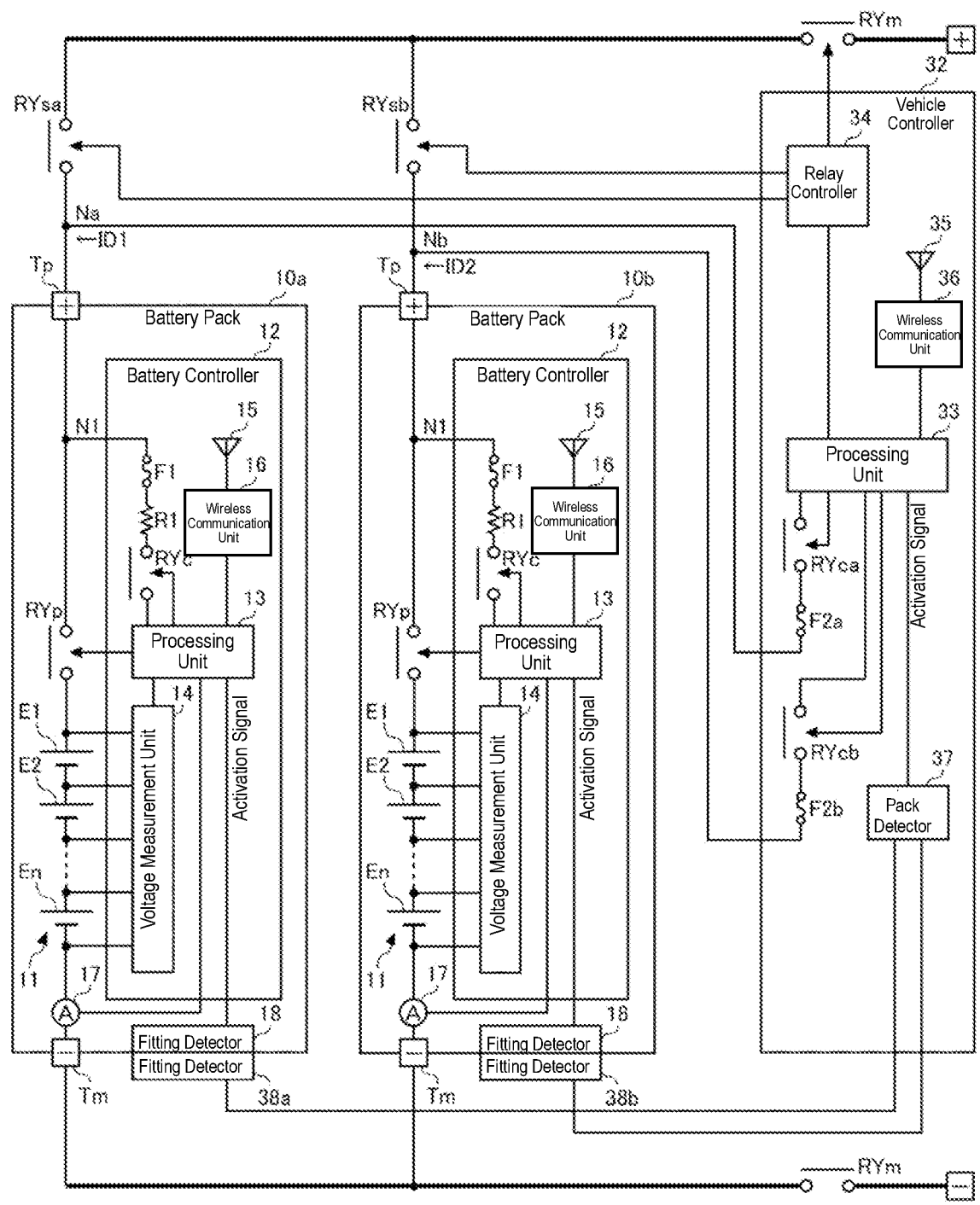
FIG. 4 is a diagram illustrating a system configuration example of a battery pack mounted on the vehicle and a vehicle controller according to the exemplary embodiment.

FIG. 4 is a diagram illustrating a system configuration example 1 of battery pack 10 mounted in vehicle 30 and vehicle controller 32 according to the exemplary embodiment. In the example illustrated in FIG. 4, two battery packs 10a and 10b are mounted in battery mounting unit 31 of vehicle 30 (see FIG. 3).

Battery pack 10 includes battery module 11 and battery controller 12. Battery module 11 is connected on a power line internally connecting positive electrode terminal Tp to negative electrode terminal Tm of battery pack 10. Positive electrode terminal Tp of battery pack 10 is connected to the positive-side power bus via slot relay RYs, and negative electrode terminal Tm of battery pack 10 is connected to the negative-side power bus. The positive-side power bus and the negative-side power bus are connected to inverter 310 via main relay RYm (see FIG. 3).

Battery module 11 includes plural cells E1 to En connected in series to one another. Battery module 11 may include plural battery modules connected in series to one another or in series and parallel to one another. Each cell may be a lithium ion battery cell, a nickel metal hydride battery cell, a lead battery cell, or the like. Hereinafter, in this specification, the description is made by assuming an example where a lithium ion battery cell (having a nominal voltage of 3.6 V to 3.7 V) is used as the cell. The number of cells E1 to En is determined in accordance with a drive voltage of motor 311.

A communication path is branched from node N1 between positive electrode terminal Tp of battery pack 10 and battery module 11. Power relay RYp is inserted between node N1 and battery module 11. Current sensor 17 is installed on the power line internally connecting positive electrode terminal Tp to negative electrode terminal Tm of battery pack 10. Current sensor 17 is installed at a position closer to negative electrode terminal Tm than power relay RYp. Current sensor 17 is configured to measure a current flowing through battery module 11, and outputs the measured current value to processing unit 13 of battery controller 12. Current sensor 17 may include, for example, a combination of a shunt resistor, a differential amplifier, and an A/D converter. A Hall element may be used in place of the shunt resistor.

Battery controller 12 includes processing unit 13, voltage measurement unit 14, antenna 15, and wireless communication unit 16. Voltage measurement unit 14 is connected via plural voltage measurement lines to nodes between plural cells E1 to En, connected in series to one another. Voltage measurement unit 14 is configured to measure voltages of cells E1 to En by measuring each voltage between two adjacent voltage measurement lines. Voltage measurement unit 14 transmits the measured voltages of cells E1 to En to processing unit 13.

Voltage measurement unit 14 has a higher voltage than processing unit 13 and hence, voltage measurement unit 14 is connected to processing unit 13 via a communication line while voltage measurement unit 14 is insulated from processing unit 13. Voltage measurement unit 14 can be implemented by an application specific integrated circuit (ASIC) or a general-purpose analog front-end IC. Voltage measurement unit 14 includes a multiplexer and an A/D converter. The multiplexer outputs a voltage between two adjacent voltage measurement lines to the A/D converter in order from the top. The A/D converter converts analog voltages input from the multiplexer into digital values.

While not illustrated in FIG. 4, at least one temperature sensor is installed near plural cells E1 to En. The temperature sensor measures the temperatures of cells E1 to En, and outputs the measured temperatures to processing unit 13. The temperature sensor may include, for example, a combination of a thermistor, a voltage dividing resistor, and an A/D converter.

In the case that an A/D converter is mounted in processing unit 13 and an analog input port is installed in processing unit 13, output values of current sensor 17 and the temperature sensor can be input, as analog values, to processing unit 13.

Fitting detector 18 is configured to detect a fitting state between the connector of battery pack 10 and the connector of battery mounting unit 31 of vehicle 30. For example, the connector of battery pack 10 may be a female connector, and the connector of battery mounting unit 31 of vehicle 30 may be a male connector. Fitting detector 18 outputs activation signals corresponding to connection states of both the connectors to processing unit 13. The activation signal is defined by a binary signal: an ON signal output while both the connectors are connected to each other; and an OFF signal output while both the connectors are separated to each other. Fitting detector 18 may be implemented by, for example, a reed switch. In this case, fitting detector 18 magnetically determines whether both the connectors are connected to each other or not. The fitting detector may be implemented by a sensor configured to mechanically detect the presence or absence of connection between both the connectors may be used.

Wireless communication unit 16 executes a near-field communication process. In the present exemplary embodiment, wireless communication unit 16 includes a BLE module, and antenna 15 includes a chip antenna built in the BLE module or a pattern antenna. Wireless communication unit 16 is configured to output, to processing unit 13, data received via near-field communication, and to transmit, via near-field communication, data input from processing unit 13.

Node N1 between positive electrode terminal Tp of battery pack 10 and battery module 11 is connected to processing unit 13 via a communication path. Fuse F1, resistor R1, and pack-side communication relay RYc are connected in series to one another on the communication path. Fuse F1 is a protector preventing an overcurrent from flowing into processing unit 13 from the power line.

Processing unit 13 includes a microcomputer. Processing unit 13 is activated when the activation signal input from fitting detector 18 is turned on, and is shut down when the activation signal is turned off. Instead of shutdown, transition to a standby state or a sleep state may be performed.

Processing unit 13 controls conduction or interruption of the communication path between node N1 and processing unit 13 by controlling turning on and off of pack-side communication relay RYc. Processing unit 13 is configured to control states of cells E1 to En based on the voltage values, the current values, and the temperature values of the cells E1 to En measured by voltage measurement unit 14, current sensor 17, and the temperature sensor. For example, when overvoltage, undervoltage, overcurrent, high-temperature anomaly, or low-temperature anomaly occurs, processing unit 13 turns off power relay RYp to protect the cells E1 to En.

Processing unit 13 is configured to estimate the SOCs and the SOHs of cells E1 to En. Processing unit 13 is configured to estimate the SOCs by an open circuit voltage (OCV) method or a current integration method. The SOH is defined as a ratio of a current full charge capacity to an initial full charge capacity. The SOH having a lower value (closer to 0%) indicates that degradation progresses more. The SOH may be obtained by measuring the capacity through full charging and discharging, or may be obtained by adding storage degradation and cycle degradation. The storage degradation may be estimated based on the SOC, the temperature, and a storage degradation rate. The cycle degradation may be estimated based on a range of the SOC in which the battery pack is used, a temperature, a current rate, and a cycle degradation rate. The storage degradation rate and the cycle degradation rate may be previously derived by experiments or simulations. The SOC, the temperature, the range of the range of the SOC, and the current rate may be obtained by measurement.

The SOH may be estimated based on a correlation between the SOH and an internal resistance of a cell. The internal resistance may be estimated by dividing, by the current value, a voltage drop that occurs when a predetermined current flows through the cell for a predetermined time. The internal resistance decreases as the temperature rises, and increases as the SOH decreases.

In the system configuration example 1 illustrated in FIG. 4, vehicle controller 32 includes processing unit 33, relay controller 34, antenna 35, wireless communication unit 36, and pack detector 37. Relay controller 34 is configured to control turning on and off of main relay RYm, first slot relay RYsa, and second slot relay RYsb in response to an instruction from processing unit 33.

Node Na between positive electrode terminal Tp of first battery pack 10a and first slot relay RYsa is connected to processing unit 33 of vehicle controller 32 via a communication path. Fuse F2a and first vehicle-side communication relay RYca are connected in series to each other on the communication path. Processing unit 33 controls conduction or interruption of the communication path between node Na and processing unit 33 by controlling turning on and off of first vehicle-side communication relay RYca.

Similarly, node Nb between positive electrode terminal Tp of second battery pack 10b and second slot relay RYsb is connected to processing unit 33 of vehicle controller 32 via a communication path. Fuse F2b and second vehicle-side communication relay RYcb are connected in series to each other on the communication path. Processing unit 33 controls conduction or interruption of the communication path between node Nb and processing unit 33 by controlling turning on and off of second vehicle-side communication relay RYcb.

In the case that three or more mounting slots are provided in battery mounting unit 31 of vehicle 30, three or more slot relays RYs and three or more communication paths (fuse F2 and vehicle-side communication relay RYc) are provided in parallel.

First fitting detector 38a detects a fitting state between the connector of first mounting slot SLa1 of battery mounting unit 31 and the connector of first battery pack 10a, and outputs to pack detector 37 a detection signal indicating that these connectors are fitted. Similarly, second fitting detector 38b detects a fitting state between the connector of second mounting slot SLa2 of battery mounting unit 31 and the connector of second battery pack 10b, and outputs to pack detector 37 a detection signal indicating that these connectors are fitted. First fitting detector 38a and second fitting detector 38b may detect whether or not the connectors of the mounting slots are connected to the connectors of battery pack 10 by a magnetic method or a mechanical method.

Pack detector 37 outputs to processing unit 33 activation signals corresponding to detection signals input from fitting detectors 38a and 38b. When at least one of the detection signals indicates the connection state, pack detector 37 outputs an activation signal including a slot number of the connection state. When all of the detection signals indicate disconnection states, pack detector 37 controls the activation signal such that the activation signal is in an off state.

Processing unit 33 is activated when the activation signal input from pack detector 37 is turned on, and is shut down when the activation signal is turned off. Instead of shutdown, transition to a standby state or a sleep state may be performed.

In the system configuration example 1 described above, processing unit 33 of vehicle controller 32 may transmit and receive a control signal to and from processing unit 13 of battery controller 12 via near-field communication.

Processing unit 33 of vehicle controller 32 may transmit and receive the control signal to and from processing unit 13 of battery controller 12 wiredly, i.e., via a wired path. When communication with processing unit 13 of first battery pack 10a is wiredly performed, processing unit 33 of vehicle controller 32 turns off first slot relay RYsa and turns on first vehicle-side communication relay RYca. Processing unit 13 of first battery pack 10a turns off power relay RYp and turns on pack-side communication relay RYc of first battery pack 10a. In this state, the wired path between processing unit 33 of vehicle controller 32 and processing unit 13 of first battery pack 10a is electrically conducted while being insulated from vehicle 30 and a high-voltage unit of battery pack 10. Therefore, serial communication may be performed between processing unit 33 of vehicle controller 32 and processing unit 13 of first battery pack 10a at a voltage (for example, less than or equal to a voltage of 5V) corresponding to an operating voltage of the processing unit.

Similarly, when communication with processing unit 13 of second battery pack 10b is performed wiredly, via a wire, processing unit 33 of vehicle controller 32 turns off second slot relay RYsb and turns on second vehicle-side communication relay RYcb. Processing unit 13 of second battery pack 10b turns off power relay RYp and turns on pack-side communication relay RYc in second battery pack 10b. In this state, the wired path between processing unit 33 of vehicle controller 32 and processing unit 13 of second battery pack 10b is electrically conducted while being insulated from vehicle 30 and the high-voltage unit of battery pack 10.

While not illustrated in FIG. 2, the same configuration as vehicle controller 32 illustrated in FIG. 4 is also provided in controller 22 of charging device 20. Processing unit 23 of charging device 20 may transmit and receive a control signal to and from processing unit 13 of battery controller 12 via near-field communication between wireless communication unit 26 of charging device 20 and wireless communication unit 16 of battery controller 12. Processing unit 23 of charging device 20 may transmit and receive the control signal to and from processing unit 13 of battery controller 12 wiredly, via a wired path.

Figure 5:
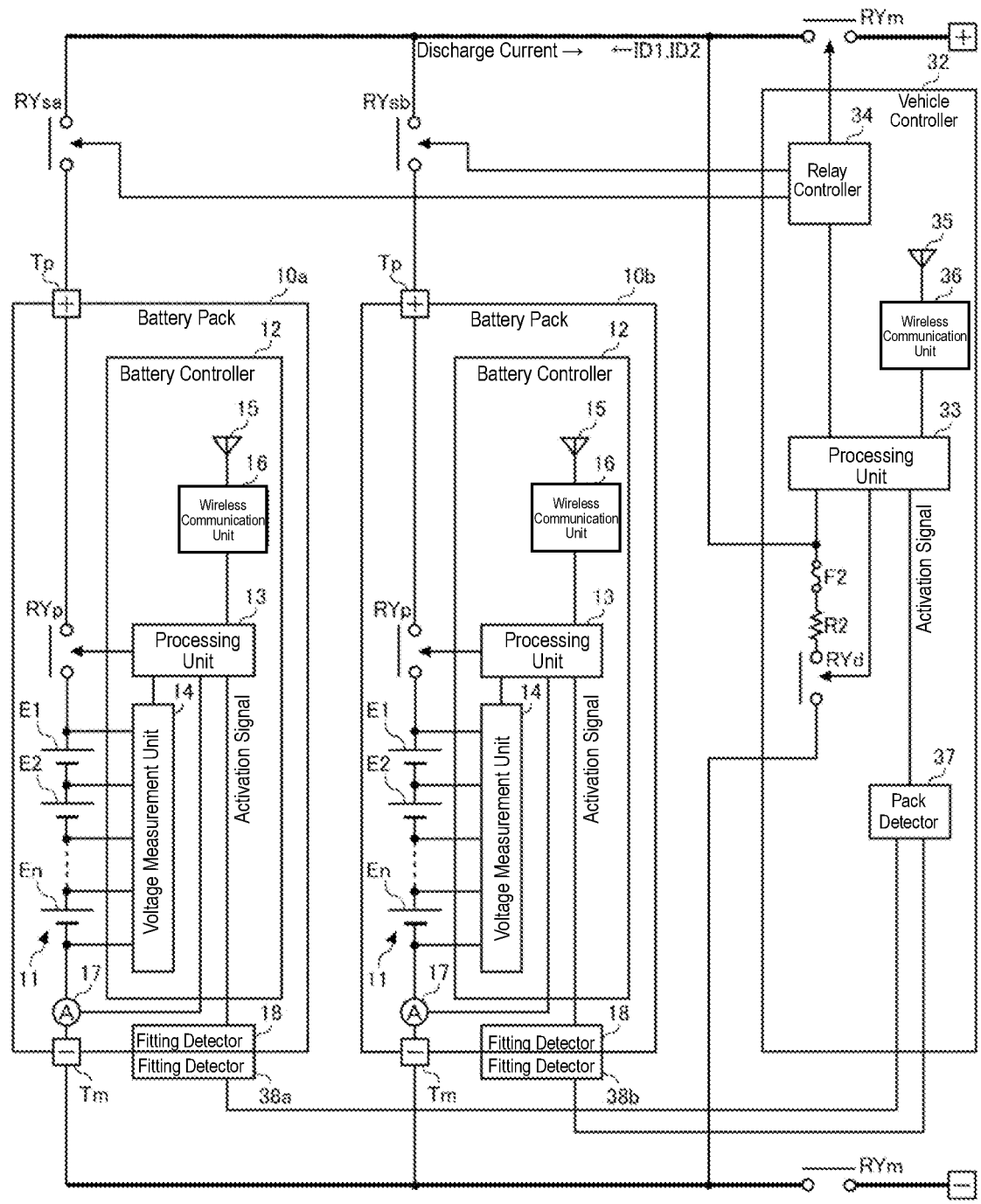
FIG. 5 is a diagram illustrating system configuration example 2 of a battery pack mounted on the vehicle and a vehicle controller according to the exemplary embodiment.

FIG. 5 is a diagram illustrating system configuration example 2 of battery pack 10 mounted in vehicle 30 and vehicle controller 32 according to the exemplary embodiment. Hereinafter, differences from system configuration example 1 shown in FIG. 4 will be described below. System configuration example 2 does not include a communication path (including fuse F1, resistor R1, and pack-side communication relay RYc) between processing unit 13 and node N1 between positive electrode terminal Tp of battery pack 10 and battery module 11 is not provided. System configuration example 2 does not include a communication path (including fuse F2a and first vehicle-side communication relay RYca) between processing unit 33 of vehicle controller 32 and node Na between positive electrode terminal Tp of first battery pack 10a and first slot relay RYsa. System configuration example 2 does not include a communication path (including fuse F2b and second vehicle-side communication relay RYcb) between processing unit 33 of vehicle controller 32 and node Nb between positive electrode terminal Tp of second battery pack 10b and second slot relay RYsb.

In system configuration example 2, a discharge path is provided between the positive-side power bus and the negative-side power bus. Fuse F2, resistor R2, and discharge relay RYd are connected in series to none another on the discharge path. Processing unit 33 can conduct the positive-side power bus to the negative-side power bus by turning on discharge relay RYd.

In system configuration example 2, processing unit 33 of vehicle controller 32 is configured to transmit and receive a control signal to and from processing unit 13 of battery controller 12 via near-field communication.

Processing unit 33 of vehicle controller 32 is configured to wiredly deliver control information to processing unit 13 of battery controller 12. When control information is wiredly delivered to processing unit 13 of first battery pack 10a, processing unit 33 of vehicle controller 32 turns on first slot relay RYsa and turns off second slot relay RYsb. In this state, processing unit 33 performs control such that discharge relay RYd is turned on or off according to a pulse pattern indicating the control information. As a result, a discharge current including the pulse pattern flows from a positive electrode of first battery pack 10a to a negative electrode of first battery pack 10a via the discharge path. Current sensor 17 of first battery pack 10a detects the current including the pulse pattern and outputs the current to processing unit 13. Processing unit 13 receives the control information corresponding to the pulse pattern based on a current value including the pulse pattern input from current sensor 17.

Similarly, when control information is wiredly delivered to processing unit 13 of second battery pack 10b, processing unit 33 of vehicle controller 32 turns on second slot relay RYsb and turns off first slot relay RYsa. In this state, processing unit 33 performs control such that discharge relay RYd is turned on or off according to a pulse pattern indicating the control information. As a result, a discharge current including the pulse pattern flows from the positive electrode of second battery pack 10b to the negative electrode of second battery pack 10b via the discharge path. Current sensor 17 of second battery pack 10b detects the current including the pulse pattern and outputs the current to processing unit 13. Processing unit 13 receives the control information corresponding to the pulse pattern based on a current value including the pulse pattern input from current sensor 17.

While not illustrated in FIG. 2, the same configuration as the configuration of vehicle controller 32 illustrated in FIG. 5 is also provided in controller 22 of charging device 20. Processing unit 23 of charging device 20 is configured to transmit and receive a control signal to and from processing unit 13 of battery controller 12 via near-field communication. Processing unit 23 of charging device 20 is configured to wiredly transmit and receive the control signal to and from processing unit 13 of battery controller 12.

In both the configuration examples of system configuration example 1 illustrated in FIG. 4 and system configuration example 2 illustrated in FIG. 5, wireless communication and wired communication may be performed between processing unit 33 of vehicle controller 32 and processing unit 13 of battery controller 12. Wireless communication schemes are the same between system configuration example 1 and system configuration example 2. A wired communication scheme is voltage communication in system configuration example 1, and is current communication in system configuration example 2.

Figure 6:
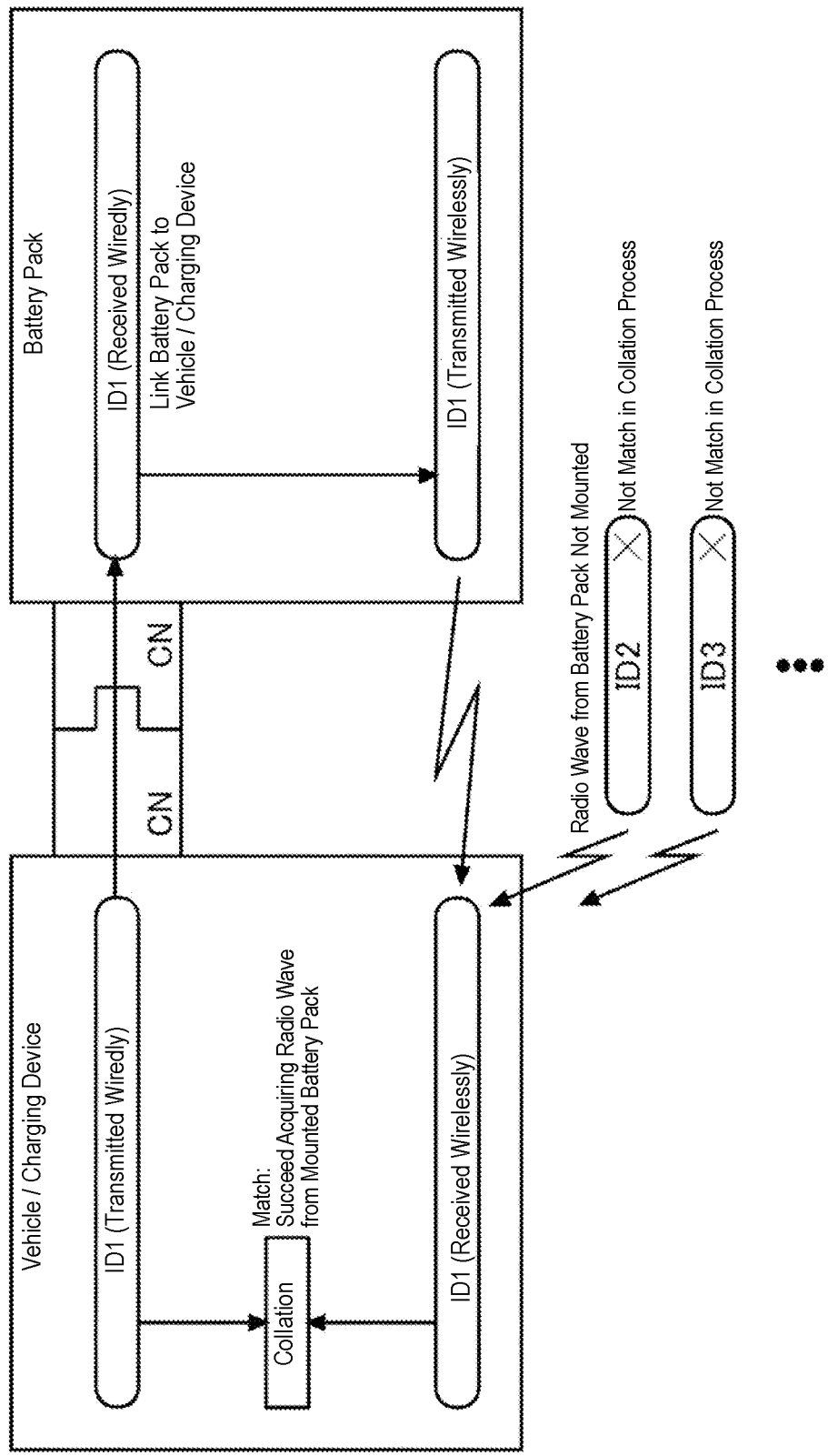
FIG. 6 is a diagram illustrating a basic concept of a process of authenticating, by a vehicle controller, the battery pack mounted in a mounting slot of the vehicle.

FIG. 6 is a diagram illustrating a basic concept of a process of authenticating, by vehicle controller 32, battery pack 10 mounted in mounting slot SLa of vehicle 30. Vehicle controller 32 is basically configured to identify battery pack 10 by searching for a radio wave of the near-field communication transmitted from battery pack 10. Specifically, when battery pack 10 is mounted in mounting slot SLa, vehicle controller 32 wiredly transmits ID1. Upon wiredly receiving the ID1 from vehicle controller 32, battery controller 12 of battery pack 10 transmits a signal including the ID1 via near-field communication.

Upon receiving the signal via the near-field communication, vehicle controller 32 collates the ID included in the received signal with ID1 previously transmitted wiredly. When both the IDs match, vehicle controller 32 authenticates that battery pack 10 mounted in mounting slot SLa is identical to a partner device communicating via the near-field communication. When both the IDs do not match, vehicle controller 32 determines that the partner device communicating via the near-field communication is not identical to battery pack 10 mounted in mounting slot SLa, and does not authenticate battery pack 10 of the partner device. For example, when a signal including ID2 is received, since the ID does not match ID1 transmitted wiredly, battery pack 10 which has transmitted the signal including the ID2 is not authenticated.

Vehicle controller 32 may determine identity between battery pack 10 mounted in mounting slot SLa and the partner device communicating via the near-field communication by transmitting the ID via the near-field communication and collating the transmitted ID with the ID received wiredly from battery controller 12 of battery pack 10.

A basic concept of the process of authenticating, by vehicle controller 32, battery pack 10 mounted in mounting slot SLa of vehicle 30 has been described above, the same is applicable to a case where controller 22 of charging device 20 authenticates battery pack 10 mounted in charging slot SLc of charging device 20.

Figure 7:
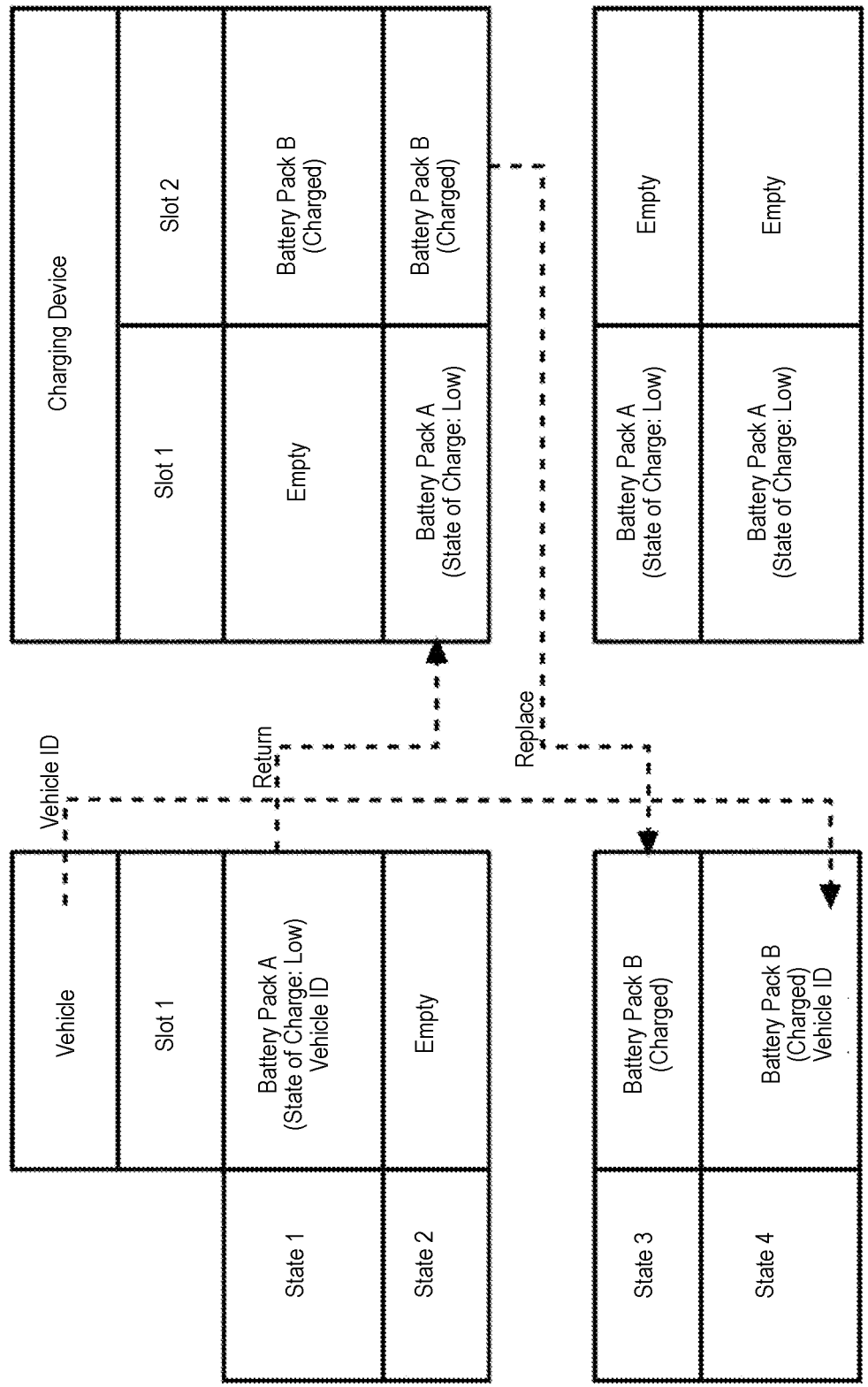
FIG. 7 is a diagram schematically illustrating a flow of ID assignment to the replaced battery pack when the battery pack mounted in the mounting slot of the vehicle is replaced.

FIG. 7 is a diagram schematically illustrating a flow of ID assignment to battery pack 10 after replacement when battery pack 10 mounted in mounting slot SLa of vehicle 30 is replaced. In state 1, first charging slot SLc1 of charging device 20 is an empty slot, and charged second battery pack 10b is mounted in second charging slot SLc2. First battery pack 10a having a reduced state of charge is mounted in first mounting slot SLa1 of vehicle 30. First battery pack 10a includes a vehicle ID authenticated by vehicle controller 32. The vehicle ID ensures the identity between first battery pack 10a as a physical connection partner device and first battery pack 10a as a connection partner device of wireless communication as viewed from vehicle 30.

In state 2, the user (usually, the driver of vehicle 30) detaches first battery pack 10a from first mounting slot SLa1 of vehicle 30, and detached first battery pack 10a is mounted in first charging slot SLc1 of charging device 20. When first battery pack 10a is rented, a work of returning first battery pack 10a to charging device 20 is performed. When first battery pack 10a is detached from mounting slot Sla1, battery controller 12 of first battery pack 10a deletes the vehicle ID retained in battery controller 12.

In state 3, the user detaches second battery pack 10b from second charging slot SLc2 of charging device 20, and detached second battery pack 10b is mounted in first mounting slot SLa1 of vehicle 30. Battery pack 10 mounted in first mounting slot SLa1 of vehicle 30 is thus physically replaced.

In state 4, vehicle controller 32 assigns a new vehicle ID to second battery pack 10b mounted in first mounting slot SLc1. The new vehicle ID secures identity between second battery pack 10b as a physical connection partner device and second battery pack 10b as a partner device communicating wirelessly as viewed from vehicle 30.

Figure 8:
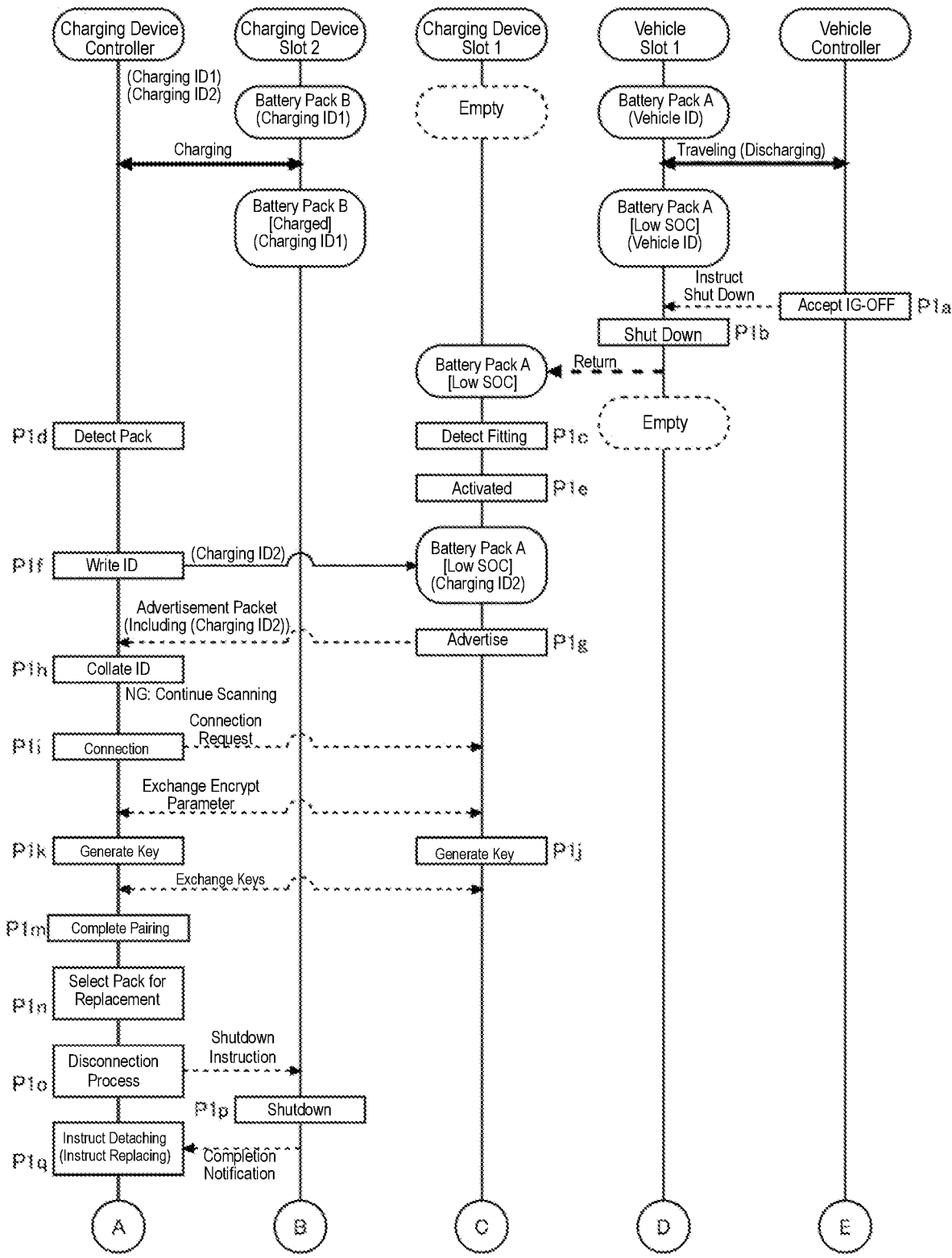
FIG. 8 is a sequence diagram illustrating a detailed process flow when the battery pack mounted in the mounting slot of the vehicle is replaced in system configuration example 1 (part 1).
Figure 9:
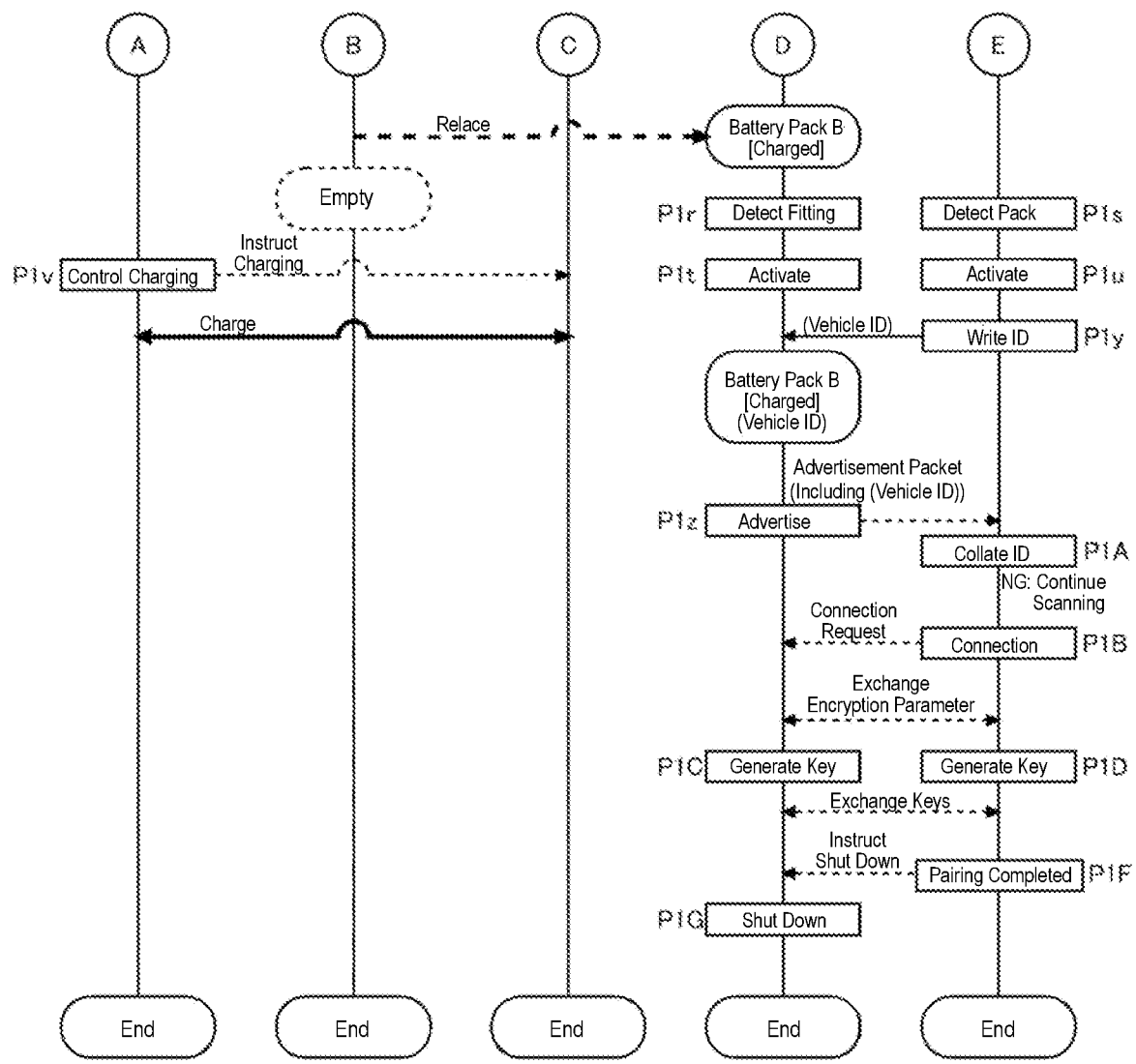
FIG. 9 is a sequence diagram illustrating a detailed process flow when the battery pack mounted in the mounting slot of the vehicle is replaced in system configuration example 1 (part 2).

FIG. 8 is a sequence diagram illustrating a detailed process flow in system configuration example 1 when battery pack 10 mounted in mounting slot SLa of vehicle 30 is replaced (part 1). FIG. 9 is a sequence diagram illustrating a detailed process flow in system configuration example 1 when battery pack 10 mounted in mounting slot SLa of vehicle 30 is replaced (part 2). In horizontal lines in the following sequence diagrams, thin dotted lines denote wireless communication, thin solid lines denote wired communication, thick dotted lines denote physical movement of the battery pack, and thick solid lines denote charging and discharging of battery packs.

First charging slot SLc1 of charging device 20 is an empty slot, and second battery pack 10b is mounted in second charging slot SLc2. Second battery pack 10b includes a charging ID1 authenticated by controller 22 of charging device 20. The charging ID1 ensures identity between second battery pack 10b as a physical connection partner device and second battery pack 10b as a partner device communicating wirelessly as viewed from charging device 20.

Charging device 20 charges second battery pack 10b mounted in second charging slot SLc2. That is, a charging current flows from charging unit 29 to second battery pack 10b mounted in second charging slot SLc2. When the SOC of second battery pack 10b reaches an upper limit value, the charging is ended. The upper limit value may be an SOC corresponding to a full charge capacity or an SOC lower than the full charge capacity (for example, 90%).

First battery pack 10a is mounted in first mounting slot SLa1 of vehicle 30. First battery pack 10a includes a vehicle ID authenticated by vehicle controller 32. The vehicle ID ensures identity between first battery pack 10a as a physical connection partner device and first battery pack 10a as a connection partner device of wireless communication as viewed from vehicle 30. While vehicle 30 travels, a discharge current flows from first battery pack 10a to motor 311 via inverter 310. The SOC of first battery pack 10a decreases as vehicle 30 travels.

When an ignition-off operation is performed by the user (usually, the driver of vehicle 30), vehicle controller 32 accepts the ignition-off operation (P1a). Upon accepting the ignition off operation, vehicle controller 32 transmits a shutdown instruction to battery controller 12 of first battery pack 10a via near-field communication. Upon receiving the shutdown instruction from vehicle controller 32, battery controller 12 of first battery pack 10a is shut down (P1b).

After first battery pack 10a is unmounted from first mounting slot SLa1 of vehicle 30 by the user and first battery pack 10a is mounted in first charging slot SLc1 of charging device 20, fitting detector 18 of first battery pack 10a detects the fitting in first charging slot SLc1 (P1c), and battery controller 12 of first battery pack 10a is activated (P1e). Controller 22 of charging device 20 detects that battery pack 10 is mounted in first charging slot SLc1 (P1d). Upon recognizing that battery pack 10 is detached from first mounting slot SLc1, vehicle controller 32 of vehicle 30 deletes the vehicle ID.

Controller 22 of charging device 20 wiredly transmits a charging ID2 to battery controller 12 of first battery pack 10a mounted in first charging slot SLc1, and writes the charging ID2 to battery controller 12 of first battery pack 10a (P3f). When battery controller 12 of first battery pack 10a receives the charging ID2, battery controller 12 serves as a beacon terminal (peripheral terminal) and executes advertising via near-field communication (P1g). Specifically, battery controller 12 transmits periodically at constant intervals an advertisement packet including the charging ID2 received wiredly, as a beacon packet. The advertisement packet functions as a signal for notifying controller 22 of charging device 20 as the central terminal or vehicle controller 32 of vehicle 30 of the presence of the host vehicle.

Upon receiving the advertisement packet, controller 22 of charging device 20 collates the charging ID included in the received advertisement packet with the charging ID previously transmitted wiredly (P1h). In the example illustrated in FIG. 8, when the charging ID included in the received advertisement packet is the charging ID2, the collation succeeds. When the charging ID is not the charging ID2, the collation does not succeed, thus failing. When the collation fails, controller 22 of charging device 20 continues scanning of the advertisement packet. When the collation succeeds, controller 22 of charging device 20 starts a connection process to be connected to battery controller 12 of first battery pack 10a (P1i).

First, controller 22 of charging device 20 transmits a connection request to battery controller 12 of first battery pack 10a. Subsequently, encryption parameters (for example, the number of digits of an encryption key and an encryption level) are exchanged between controller 22 of charging device 20 and battery controller 12 of first battery pack 10a. Battery controller 12 of first battery pack 10a generates an encryption key used to encrypt communication data based on the exchanged encryption parameter (P1j). Controller 22 of charging device 20 generates an encryption key used to encrypt the communication data based on the exchanged encryption parameter (P1k). Finally, the generated encryption keys are exchanged between controller 22 of charging device 20 and battery controller 12 of first battery pack 10a. As a result, pairing between controller 22 of charging device 20 and battery controller 12 of first battery pack 10a is completed (P1m). The completion of the pairing completes a process of returning first battery pack 10a to charging device 20.

Controller 22 of charging device 20 selects another battery pack 10 with which first battery pack 10a is replaced (P1*n*). Specifically, controller 22 of charging device 20 selects one of charged battery packs 10 mounted in the charging slots SLc of charging stand 21. In the example illustrated in FIG. 8, charged second battery pack 10*b* mounted in second charging slot SLc2 is selected.

Controller 22 of charging device 20 transmits a shutdown instruction to battery controller 12 of selected second battery pack 10*b* via near-field communication, and executes a disconnection process to be disconnected from battery controller 12 of second battery pack 10*b* (P1*o*). Upon receiving the shutdown instruction from controller 22 of charging device 20, battery controller 12 of second battery pack 10*b* is shut down (P1*p*). Battery controller 12 of second battery pack 10*b* transmits a shutdown completion notification to controller 22 of charging device 20 immediately before being shut down.

Upon receiving the shutdown completion notification from battery controller 12 of second battery pack 10*b*, controller 22 of charging device 20 instructs the user of vehicle 30 to detach second battery pack 10*b* mounted in second charging slot SLc2 (P1*q*). For example, controller 22 of charging device 20 causes display unit 27 to display a message instructing the user to detach second battery pack 10*b* mounted in second charging slot SLc2. At this moment, controller 22 of charging device 20 may output audio guidance from a loudspeaker (not illustrated) to the user. Only a lamp (not illustrated) of second charging slot SLc2 may be turned on or off. Only a lamp (not illustrated) of second charging slot SLc2 may be turned on in a color different from color of the lamp of the other charging slot.

When second battery pack 10*b* is detached from second charging slot SLc2 and second battery pack 10*b* is mounted in first mounting slot SLa1 of vehicle 30 by the user, fitting detector 18 of second battery pack 10*b* detects fitting to first mounting slot SLa1 (P1*r*), and battery controller 12 of second battery pack 10*b* is activated (P1*t*). When fitting detector 38 of vehicle 30 detects that battery pack 10 is mounted in first mounting slot SLa1 (P1*s*), vehicle controller 32 is activated (P1*u*). Upon recognizing that second battery pack 10*b* is detached from second charging slot SLc2, battery controller 12 of second battery pack 10*b* deletes the charging ID2.

Controller 22 of charging device 20 starts charging control of first battery pack 10*a* mounted in first charging slot SLc1 (P1*v*). Specifically, controller 22 of charging device 20 transmits a charging instruction to battery controller 12 of first battery pack 10*a* via near-field communication, and turns on second slot relay RYs*b*. Upon receiving the charging instruction, battery controller 12 of first battery pack 10*a* turns on power relay RY*p*. As a result, a charging current flows from charging unit 29 of charging device 20 to first battery pack 10*a* mounted in first charging slot SLc1.

Vehicle controller 32 wiredly transmits the vehicle ID to second battery pack 10*b* mounted in first mounting slot SLa1, and writes the vehicle ID to battery controller 12 of second battery pack 10*b* (P1*y*). After battery controller 12 of second battery pack 10*b* receives the vehicle ID, battery controller 12 of second battery pack 10*b* serves as a beacon terminal and executes advertising via near-field communication (P1*z*). Specifically, battery controller 12 transmits periodically at constant intervals, as a beacon packet, an advertisement packet including the vehicle ID wiredly received.

Upon receiving the advertisement packet, vehicle controller 32 collates the vehicle ID included in the received advertisement packet with the vehicle ID previously transmitted wiredly (P1A). When the collation of the vehicle ID fails, vehicle controller 32 continues scanning of the advertisement packet. When the collation of the vehicle IDs succeeds, vehicle controller 32 starts a connection process to be connected to battery controller 12 of second battery pack 10*b* (P1B).

First, vehicle controller 32 transmits a connection request to battery controller 12 of second battery pack 10*b*. Subsequently, encryption parameters are exchanged between vehicle controller 32 and battery controller 12 of second battery pack 10*b*. Battery controller 12 of second battery pack 10*b* generates an encryption key used to encrypt the communication data based on the exchanged encryption parameter (P1C). Vehicle controller 32 generates an encryption key used to encrypt communication data based on the exchanged encryption parameter (P1D). Finally, the generated encryption keys are exchanged between vehicle controller 32 and battery controller 12 of second battery pack 10*b*, thereby completing a pairing between vehicle controller 32 and battery controller 12 of second battery pack 10*b* (P1F). After the pairing is completed, vehicle controller 32 transmits a shutdown instruction to battery controller 12 of second battery pack 10*b* via near-field communication. Upon receiving the shutdown instruction from vehicle controller 32, battery controller 12 of second battery pack 10*b* is shut down (P1G).

Figure 10:
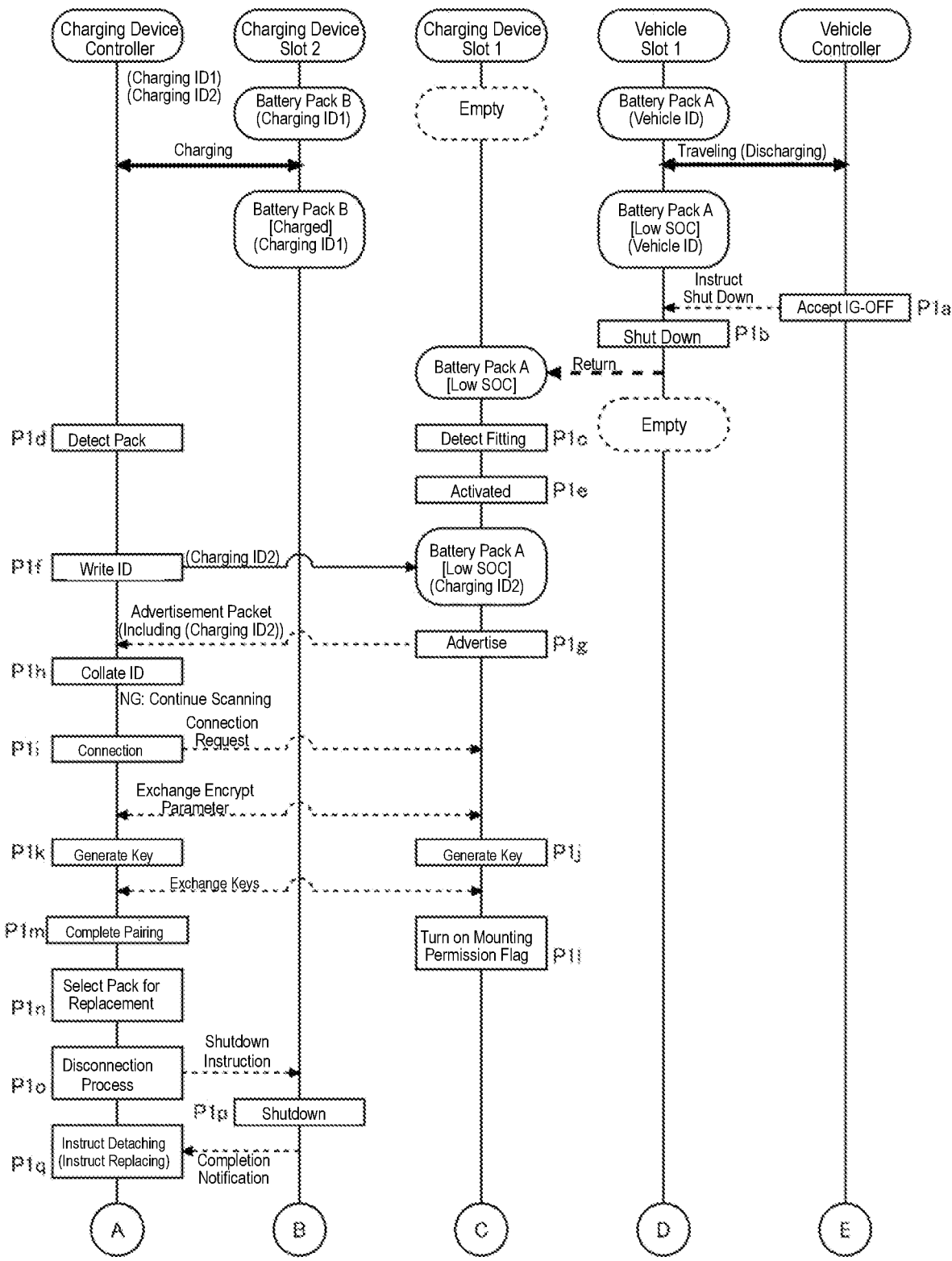
FIG. 10 is a sequence diagram illustrating a process flow according to a modification of the process illustrated in FIG. 8 (part 1).
Figure 11:
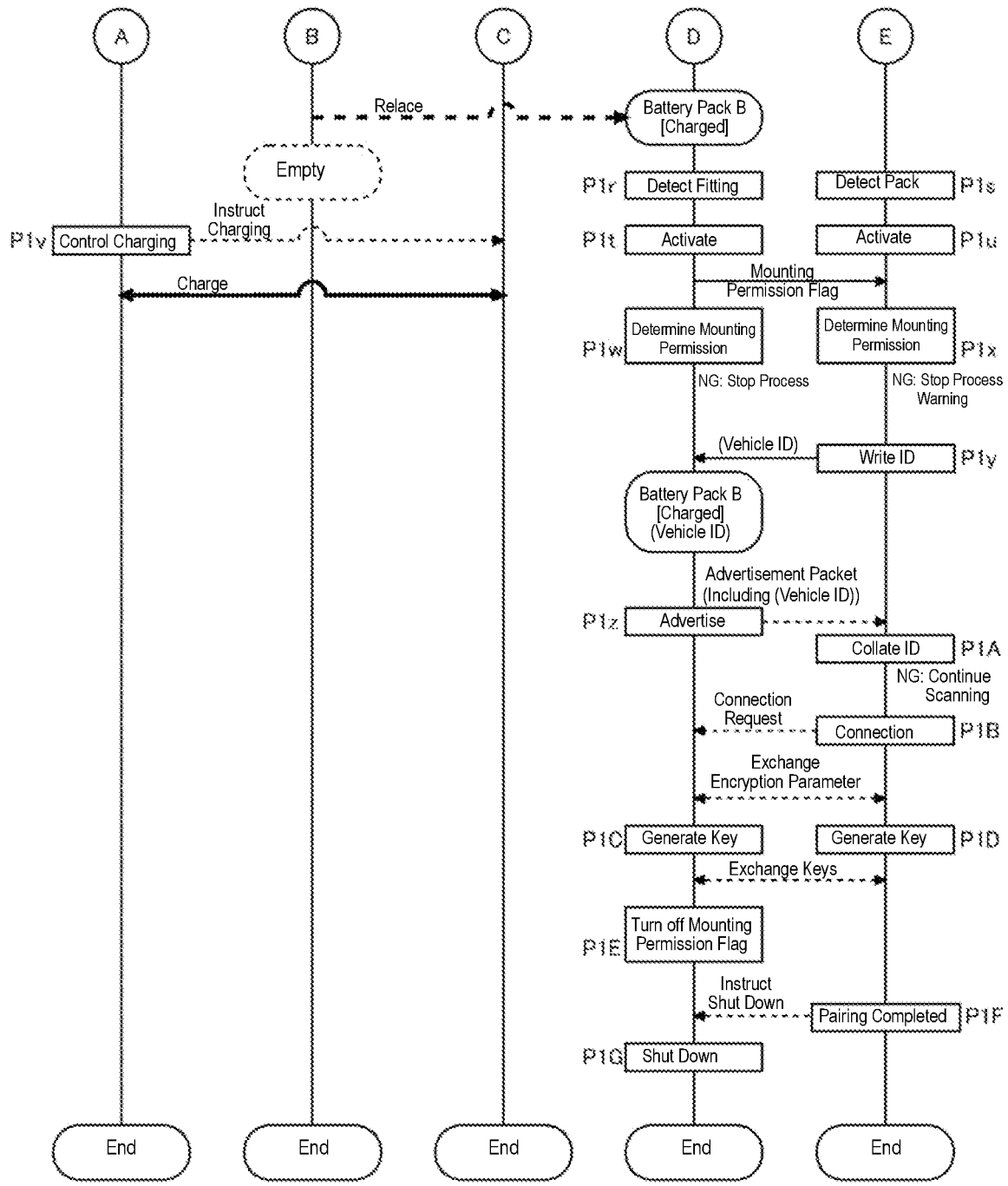
FIG. 11 is a sequence diagram illustrating a process flow according to a modification of the process illustrated in FIG. 9 (part 2).

FIG. 10 is a sequence diagram illustrating a process flow according to a modification of the process illustrated in FIG. 8 (part 1). FIG. 11 is a sequence diagram illustrating a process flow according to a modification of the process illustrated in FIG. 10 (part 2). In the processes illustrated in FIGS. 8 and 9, battery pack 10 mounted in certain vehicle 30 may be detached and mounted to another vehicle 30 for use. That is, one battery pack 10 may be shared by plural vehicles 30. Battery pack 10 illegally acquired (for example, stolen battery pack 10) may be mounted in vehicle 30 for use.

In contrast, in the modification illustrated in FIGS. 10 and 11, a mechanism that prohibits the use of battery pack 10 by providing a mounting permission flag in battery pack 10 when battery pack 10 that is not detached by a valid process is mounted in vehicle 30. Hereinafter, differences from the processes illustrated in FIGS. 8 and 9 will be described below.

After battery controller 12 of first battery pack 10*a* generates the encryption key in process P1*j*, battery controller 12 of first battery pack 10*a* rewrites the mounting permission flag to turned on the mounting permission flag (P1*l*). The mounting permission flag is a state in which the use in vehicle 30 is permitted when the mounting permission flag is turned on (for example, 1), and a state in which the use in vehicle 30 is prohibited when the mounting permission flag is turned off (for example, zero).

When battery controller 12 of second battery pack 10*b* is activated in process P1*t* and vehicle controller 32 is activated in process P1*u*, battery controller 12 of second battery pack 10*b* wiredly transmits a mounting permission/prohibition flag to vehicle controller 32. Vehicle controller 32 determines whether or not second battery pack 10*b* can be mounted based on the state of the received mounting permission flag (P1*x*). When the mounting permission flag is turned off, vehicle controller 32 interrupts the process and displays, on meter panel 39, a warning indicating that unauthorized battery pack 10 is mounted. Vehicle controller 32 may cause a loudspeaker (not illustrated) to output a warning sound indicating that unauthorized battery pack 10 is mounted. Battery controller 12 determines, based on the state of the mounting permission flag, whether second battery pack 10*b* can be mounted (P1*w*). When the mounting permission flag is turned off, battery controller 12 of second battery pack 10*b* interrupts the process.

After battery controller 12 of second battery pack 10*b* generates the encryption key in process P1C, battery controller 12 of second battery pack 10*b* performs rewriting such that the mounting permission flag is turned off (P1E).

Figure 12:
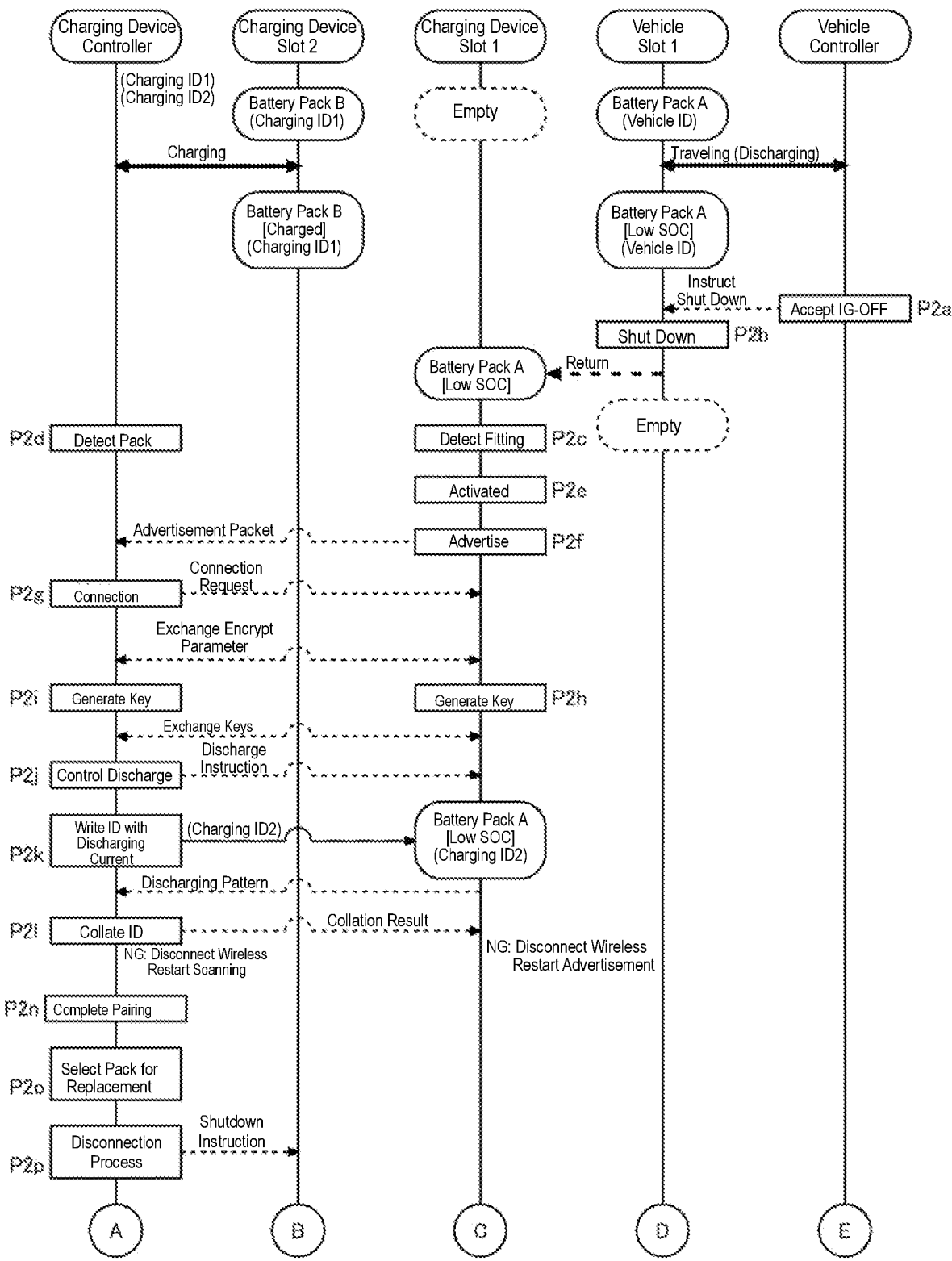
FIG. 12 is a sequence diagram illustrating a detailed process flow when the battery pack mounted in the mounting slot of the vehicle is replaced in system configuration example 2 (part 1).
Figure 13:
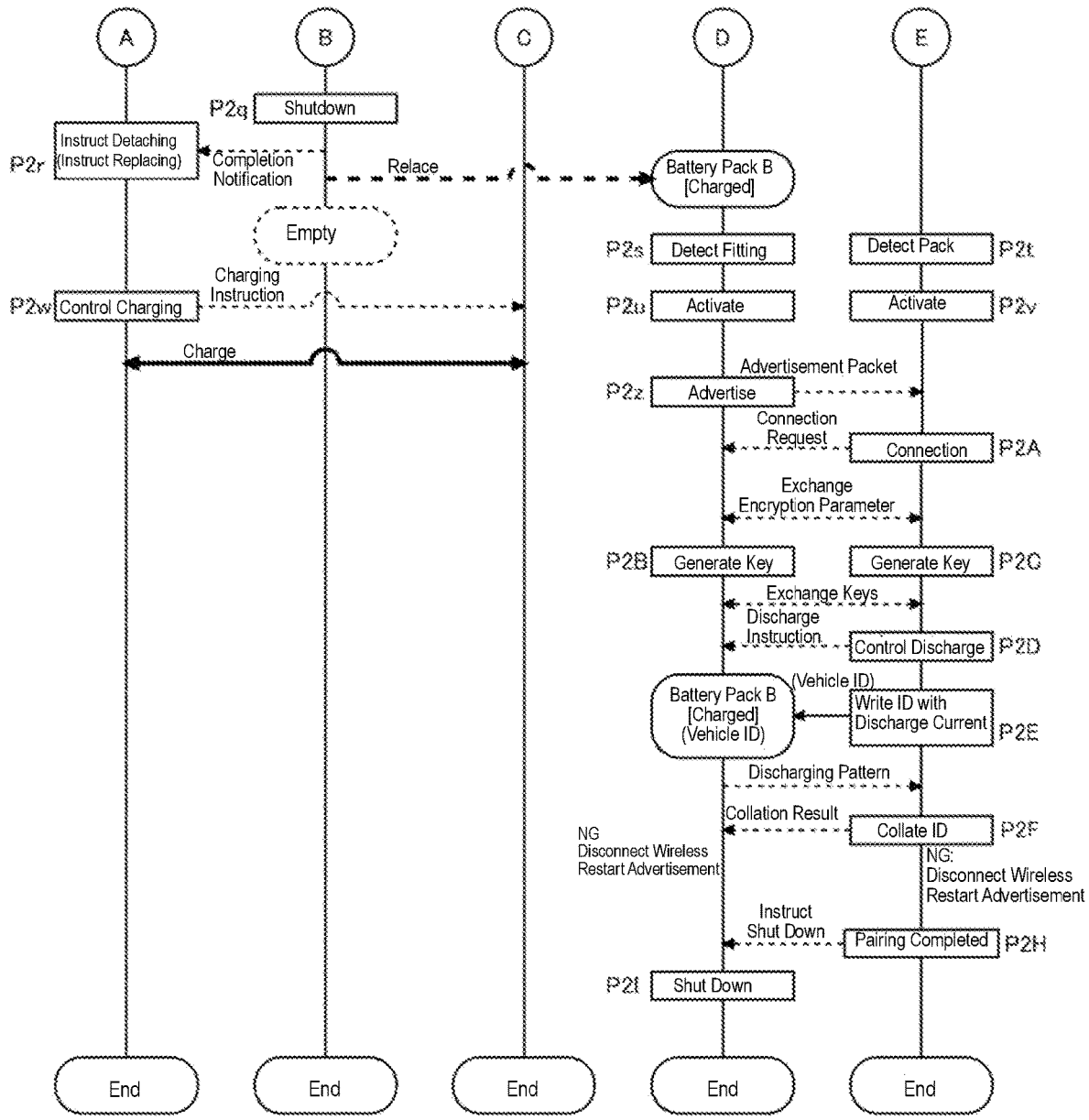
FIG. 13 is a sequence diagram illustrating a detailed process flow when the battery pack mounted in the mounting slot of the vehicle is replaced in system configuration example 2 (part 2).

FIG. 12 is a sequence diagram illustrating a detailed process flow when battery pack 10 mounted in mounting slot SLa of vehicle 30 is replaced in system configuration example 2 (part 1). FIG. 13 is a sequence diagram illustrating a detailed process flow when battery pack 10 mounted in mounting slot SLa of vehicle 30 is replaced in system configuration example 2 (part 2).

Processes from process P2*a* to process P2*e* in FIG. 12 are similar to the processes from process P1*a* to process P1*e* in FIG. 8. After battery controller 12 of first battery pack 10*a* is activated in process P2*e*, battery controller 12 of first battery pack 10*a* serves as a beacon terminal and executes the advertisement via the near-field communication (P2*f*). In the example illustrated in FIG. 12, the charging ID or the vehicle ID is not included in the advertisement packet.

Upon receiving the advertisement packet, controller 22 of charging device 20 starts a connection process to be connected with battery controller 12 of first battery pack 10*a* (P2*g*). First, controller 22 of charging device 20 transmits a connection request to battery controller 12 of first battery pack 10*a*. Subsequently, encryption parameters are exchanged between controller 22 of charging device 20 and battery controller 12 of first battery pack 10*a*. Battery controller 12 of first battery pack 10*a* generates an encryption key used to encrypt the communication data based on the exchanged encryption parameter (P2*h*). Controller 22 of charging device 20 generates the encryption key used to encrypt the communication data based on the exchanged encryption parameter (P2*i*). Finally, the generated encryption keys are exchanged between controller 22 of charging device 20 and battery controller 12 of first battery pack 10*a*. As a result, controller 22 of charging device 20 is temporarily connected to battery controller 12 of first battery pack 10*a*.

Controller 22 of charging device 20 starts discharge control of first battery pack 10*a* (P2*j*). Specifically, controller 22 of charging device 20 transmits a discharging instruction to battery controller 12 of first battery pack 10*a* via near-field communication, and turns on a discharge relay and first slot relay RYsa of charging device 20. Upon receiving the discharging instruction, battery controller 12 of first battery pack 10*a* turns on power relay RYp. As a result, a discharge path is formed across both ends of first battery pack 10*a*, and a discharge current flows through first battery pack 10*a*.

Controller 22 of charging device 20 performs control such that the discharge relay of charging device 20 is turned on or off according to the discharge pattern corresponding to the charging ID2. Battery controller 12 of first battery pack 10*a* reads the discharge pattern from the current value detected by current sensor 17 to acquire the charging ID2. With such control of the discharge current, the charging ID2 is written from controller 22 of charging device 20 to battery controller 12 of first battery pack 10*a* (P2*k*). Battery controller 12 of first battery pack 10*a* transmits via near-field communication the discharge pattern corresponding to the read charging ID2 to controller 22 of charging device 20.

Upon receiving a signal including the discharge pattern from battery controller 12 of first battery pack 10*a*, controller 22 of charging device 20 collates the charging ID indicated by the received discharge pattern with the charging ID previously delivered wiredly (P2*l*). In the example illustrated in FIG. 12, when the charging ID indicated by the discharge pattern included in the received signal is the charging ID2, the collation succeeds. When the charging ID is not the charging ID2, the collation does not succeed.

Controller 22 of charging device 20 transmits a result of the collation to battery controller 12 of first battery pack 10*a* via the near-field communication. When the collation fails, controller 22 of charging device 20 disconnects the temporary connection with battery controller 12 of first battery pack 10*a*, and restarts scanning of the advertisement packet after a predetermined time elapses. Battery controller 12 of first battery pack 10*a* disconnects the temporary connection with controller 22 of charging device 20, and restarts the advertisement via the near-field communication. When the collation succeeds, pairing between controller 22 of charging device 20 and battery controller 12 of first battery pack 10*a* is completed (P2*n*).

Processes from process P2*o* to process P2*w* in FIGS. 12 and 13 are similar to the processes from process P1*n* to process P1*v* in FIGS. 8 and 9. After battery controller 12 of second battery pack 10*b* is activated in process P2*u*, battery controller 12 of second battery pack 10*b* serves as a beacon terminal and executes the advertisement via the near-field communication (P2*z*). In the example illustrated in FIG. 13, the charging ID or the vehicle ID is not included in the advertisement packet.

Upon receiving the advertisement packet, vehicle controller 32 starts a connection process to be connected with battery controller 12 of second battery pack 10*b* (P2A). First, vehicle controller 32 transmits a connection request to battery controller 12 of second battery pack 10*b*. Subsequently, encryption parameters are exchanged between vehicle controller 32 and battery controller 12 of second battery pack 10*b*. Battery controller 12 of second battery pack 10*b* generates an encryption key used to encrypt the communication data based on the exchanged encryption parameter (P2B). Vehicle controller 32 generates an encryption key used to encrypt communication data based on the exchanged encryption parameter (P2C). Finally, the generated encryption keys are exchanged between vehicle controller 32 and battery controller 12 of second battery pack 10*b*. As a result, vehicle controller 32 is temporarily connected to battery controller 12 of second battery pack 10*b*.

Vehicle controller 32 starts discharge control of second battery pack 10*b* (P2D). Specifically, vehicle controller 32 transmits a discharging instruction to battery controller 12 of second battery pack 10*b* via the near-field communication, and turns on discharge relay RYd and second slot relay RYsb. Upon receiving the discharging instruction, battery controller 12 of second battery pack 10*b* turns on power relay RYp. As a result, a discharge path is formed across both ends of second battery pack 10*b*, and a discharge current flows through second battery pack 10*b*.

Vehicle controller 32 performs control such that discharge relay RYd is turned on or off according to the discharge pattern corresponding to the vehicle ID. Battery controller 12 of second battery pack 10*b* reads the discharge pattern from the current value detected by current sensor 17 to acquire the vehicle ID. With such control of the discharge current, the vehicle ID is read from vehicle controller 32 and written to battery controller 12 of second battery pack 10*b* (P2E). Battery controller 12 of second battery pack 10*b* transmits the discharge pattern corresponding to the read vehicle ID to vehicle controller 32 via the near-field communication.

Upon receiving the signal including the discharge pattern from battery controller 12 of second battery pack 10b, vehicle controller 32 collates the vehicle ID indicated by the received discharge pattern with the vehicle ID previously delivered wiredly (P2F). Vehicle controller 32 transmits a result of the collation to battery controller 12 of second battery pack 10b via the near-field communication. When the collation fails, vehicle controller 32 disconnects the temporary connection with battery controller 12 of second battery pack 10b, and restarts scanning of the advertisement packet after a predetermined time elapses. Battery controller 12 of second battery pack 10b disconnects the temporary connection with vehicle controller 32 and restarts the advertisement via the near-field communication. When the collation succeeds, pairing between vehicle controller 32 and battery controller 12 of second battery pack 10b is completed (P2H).

After the pairing is completed, vehicle controller 32 transmits a shutdown instruction to battery controller 12 of second battery pack 10b via the near-field communication. Upon receiving the shutdown instruction from vehicle controller 32, battery controller 12 of second battery pack 10b is shut down (P2I).

Figure 14:
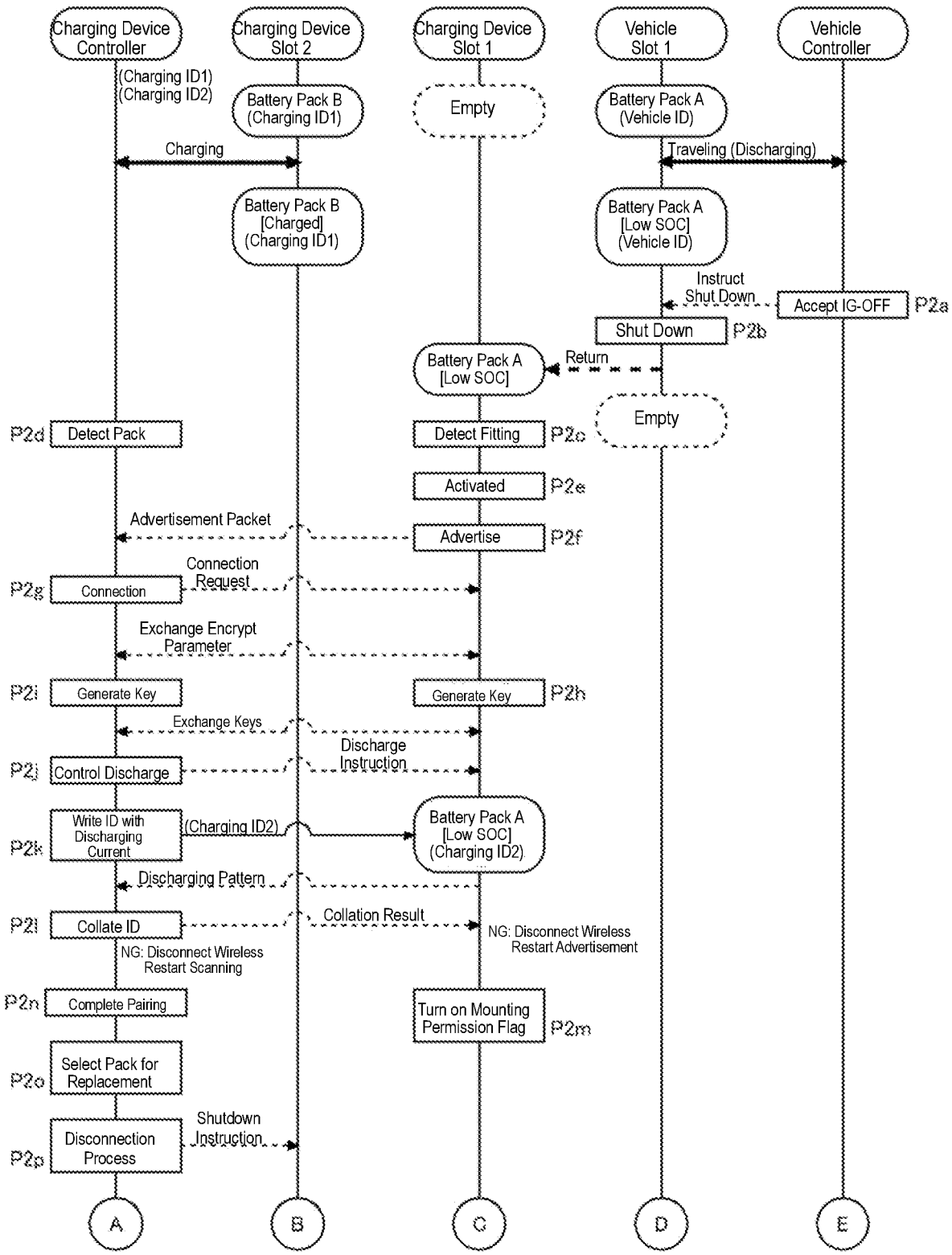
FIG. 14 is a sequence diagram illustrating a process flow according to a modification of the process illustrated in FIG. 12 (part 1).
Figure 15:
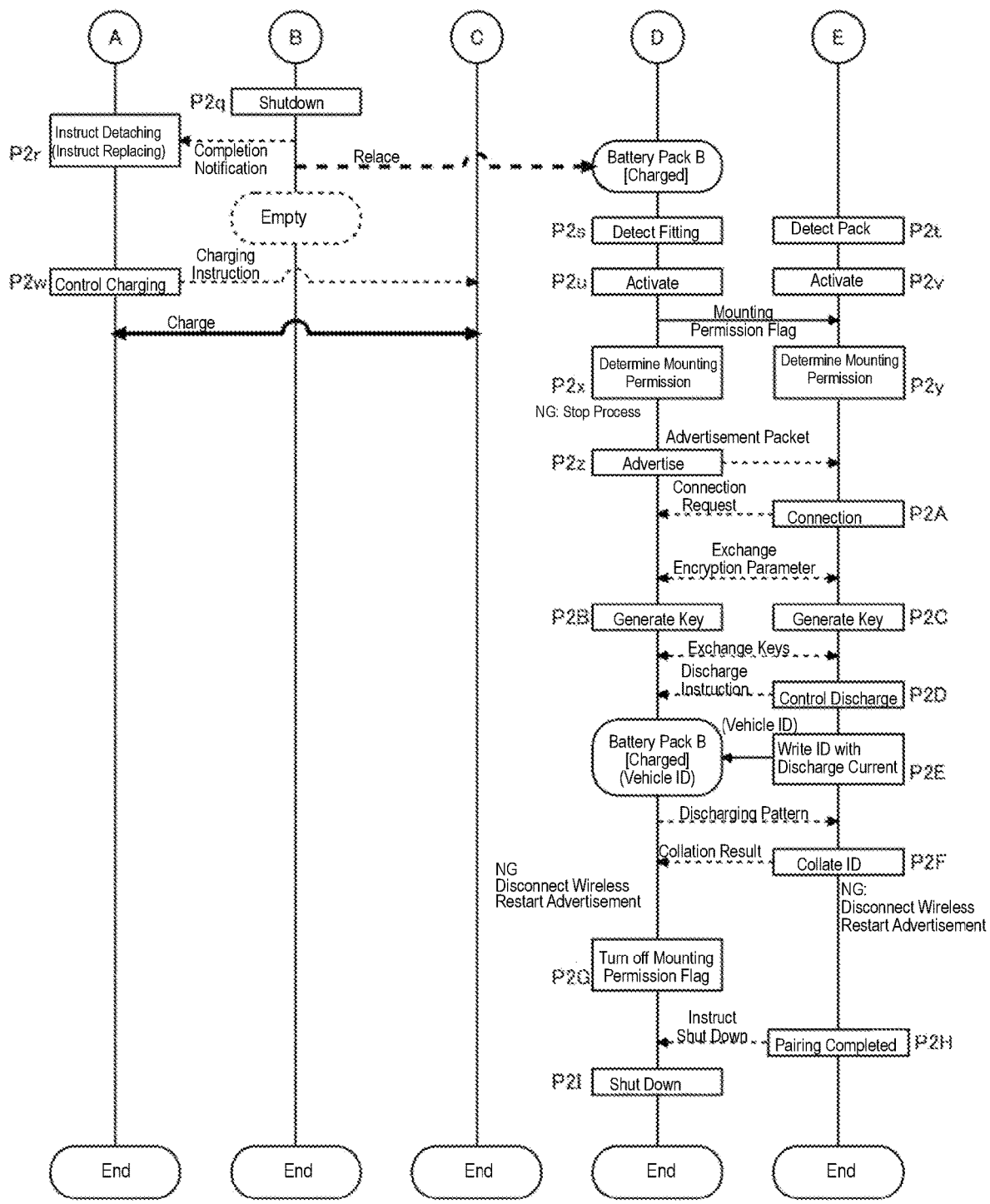
FIG. 15 is a sequence diagram illustrating a process flow according to a modification of the process illustrated in FIG. 13 (part 2).

FIG. 14 is a sequence diagram illustrating a process flow according to a modification of the process illustrated in FIG. 12 (part 1). FIG. 15 is a sequence diagram illustrating a process flow according to a modification of the process illustrated in FIG. 13 (part 2). In the modification illustrated in FIGS. 14 and 15, similarly to the processes illustrated in FIGS. 10 and 11, a mechanism that prohibits the use of battery pack 10 by providing a mounting permission flag in battery pack 10 when battery pack 10 that is not detached by a valid process is mounted in vehicle 30. Hereinafter, differences from the processes illustrated in FIGS. 12 and 13 will be described below.

In process P2l, after battery controller 12 of first battery pack 10a receives a notification indicating that the collation succeeds from controller 22 of charging device 20, battery controller 12 of first battery pack 10a rewrites the mounting permission flag to turn on the flag (P2m).

When battery controller 12 of second battery pack 10b is activated in process P2u and vehicle controller 32 is activated in process P2v, battery controller 12 of second battery pack 10b wiredly transmits the mounting permission/prohibition flag to vehicle controller 32. Vehicle controller 32 determines, based on the state of the received mounting permission flag, whether or not second battery pack 10b can be mounted (P2y). When the mounting permission flag is turned off, vehicle controller 32 interrupts the process and displays a warning indicating that unauthorized battery pack 10 is mounted on meter panel 39. Vehicle controller 32 may cause a loudspeaker (not illustrated) to output a warning sound indicating that unauthorized battery pack 10 is mounted. Battery controller 12 determines, based on the state of the mounting permission flag, whether or not second battery pack 10b can be mounted (P2x). When the mounting permission flag is turned off, battery controller 12 of second battery pack 10b interrupts the process.

In process P2C, after battery controller 12 of second battery pack 10b receives the notification indicating that the collation succeeds from vehicle controller 32, battery controller 12 of second battery pack 10b rewrites the mounting permission flag to turn off the flag (P2G).

As described above, in the present exemplary embodiment, the ID is written from vehicle 30 or charging device 20 to battery pack 10 through a wire, and the ID is looped back from battery pack 10 to vehicle 30 or charging device 20 by the near-field communication. As a result, vehicle 30 or charging device 20 that controls battery pack 10 via the near-field communication can correctly identify mounted battery pack 10. There is no malfunction such as erroneous control of battery pack 10 mounted in another nearby vehicle 30 by vehicle controller 32 of certain vehicle 30, and the safety and security of entire vehicle system 1 using replaceable battery pack 10 and charging device 20 can be secured. The user can safely drive vehicle 30 only by taking out battery pack 10 mounted in charging device 20 and mounting the battery pack in vehicle 30.

The control signals are transmitted and received between battery pack 10 and each of vehicle 30 and charging device 20 via near-field communication. This configuration reduces the number of pins included in the connector of battery pack 10. As a result, it is possible to reduce a mechanical connection failure between battery pack 10 and each of vehicle 30 and charging device 20. Firmware used in battery controller 12 of battery pack 10 can be updated via wireless communication, and the firmware can be easily updated.

When the mounting permission flag is provided in battery pack 10 as in the processes illustrated in FIGS. 10, 11, 14, and 15, it is possible to prohibit the use of battery pack 10 acquired by unauthorized means.

The present disclosure has been described above according to the exemplary embodiment. It will be understood by those who are skilled in art that the exemplary embodiment is merely an example, that combinations of constituent elements and processes included in the exemplary embodiment may be modified in various forms, and that such modifications are also within the scope of the present disclosure.

The above-described exemplary embodiment has described an example of using battery pack 10 incorporating battery module 11 including the lithium ion battery cell, the nickel hydrogen battery cell, the lead battery cell, or the like. In this regard, a capacitor pack incorporating a capacitor module including an electric double layer capacitor cell, a lithium ion capacitor cell, or the like may be used. In this specification, the battery pack and the capacitor pack are collectively referred to as a power storage pack. Each relay in the above-described exemplary embodiment may be appropriately replaced with a semiconductor switch.

In the above-described exemplary embodiment, an electric motorcycle (electric scooter) is assumed as vehicle 30 using replaceable battery pack 10 as a power source. In this respect, vehicle 30 may be an electric bicycle. Vehicle 30 may be a four-wheeled electric automobile (EV). The electric automobile includes not only a full-standard electric automobile but also a low-speed electric automobile such as a golf cart or a land car used in a shopping mall or an entertainment facility.

An electric movable body using replaceable battery pack 10 as a power source is not limited to vehicle 30. For example, the electric movable body also includes an electric ship. For example, a power source of a water bus or a water taxi may be replaceable battery pack 10. The electric movable body also includes a train. For example, a train on which replaceable battery pack 10 is mounted can be used instead of a diesel train used in a non-electrified route. The electric movable body also includes an electric flying object. The electric flight object includes a multi-copter (drone). The multi-copter includes a so-called flying car. Any electric movable body can shorten an energy supply time.

The exemplary embodiment may be specified by the following items.

Item 1

A power storage pack authentication method includes: after a power storage pack (10) detached from an electric movable body (30) is mounted in a charging slot (SLc1) of a charging device (20), wiredly transmitting, by the controller (22) of the charging device (20), identification information to a controller (12) of a power storage pack (10) mounted in the charging slot (SLc) of the charging device (20); transmitting via near-field communication, by the controller (12) of the power storage pack (10), a signal including the identification information received from the charging device (20); and after the controller (22) of the charging device (20) receives the signal transmitted via the near-field communication, collating, by the controller (22) of the charging device (20), whether or not the identification information included in the received signal matches the identification information transmitted wiredly, and authenticate that the power storage pack (10) mounted in the charging slot (SLc1) is identical to a partner device communicating via the near-field communication when the identification information included in the received signal matches the identification information wiredly transmitted.

Controller (22) of charging device (20) accurately authenticates whether or not the communication partner of the near-field communication is identical to power storage pack (10) mounted in charging slot (SLc1).

Item 2

The power storage pack authentication method according to item 1, further includes: wiredly transmitting, by a controller (32) of the electric movable body (30), identification information to the controller (12) of the power storage pack (10) mounted in the electric movable body (30) when the power storage pack (10) is detached from another charging slot (SLc2) of the charging device (20) and is mounted in the electric movable body (30); transmitting via the near-field communication, by the controller (12) of the power storage pack (10), a signal including the identification information received from the electric movable body (30); and after the controller (32) of the electric movable body (30) receives the signal transmitted via the near-field communication, collating, by the controller (32) of the electric movable body (30), whether or not the identification information included in the received signal matches the identification information wiredly transmitted, and authenticating that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 3

The power storage pack authentication method according to item 2 further includes: turning on, by the controller (22) of the charging device (20), a mounting permission flag retained in the power storage pack (10) after authenticating that the power storage pack (10) mounted in the charging slot (SLc1) is identical to the communication partner of the near-field communication; and turning off, by the controller (32) of the electric movable body (30), the mounting permission flag retained in the power storage pack (10) after authenticating that the power storage pack (10) mounted in the electric movable body (30) is identical to the communication partner of the near-field communication.

It is possible to prevent the use of power storage pack (10) acquired by unauthorized means.

Item 4

A power storage pack authentication method includes: wiredly transmitting, by a controller (32) of an electric movable body (30), identification information to a controller (12) of a power storage pack (10) after the power storage pack (10) is mounted in the electric movable body (30); transmitting via near-field communication, by the controller (12) of the power storage pack (10), a signal including the identification information received from the electric movable body (30); and after the controller (32) of the electric movable body (30) receives the signal transmitted via the near-field communication, collating, by the controller (32) of the electric movable body (30), whether or not the identification information included in the received signal matches the identification information wiredly transmitted, and authenticating that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 5

A power storage pack authentication method includes: after a power storage pack (10) detached from an electric movable body (30) is mounted in a charging slot (SLc1) of a charging device (20), transmitting via near-field communication, by a controller (12) of the power storage pack (10), a signal notifying of a presence of the power storage pack (10); after the controller (22) of the charging device (20) receives the signal transmitted via the near-field communication, temporarily connecting the controller (22) of the charging device (20) to the controller which has transmitted the received signal; wiredly transmitting, by the controller (22) of the charging device (20), identification information to the controller (12) of the power storage pack (10) mounted in the charging slot (SLc1); transmitting via the near-field communication, by the temporarily connected controller (12) of the power storage pack (10), a signal including the identification information received from the controller (22) of the charging device (20) to the controller (22) of the charging device (20) after wiredly receiving the identification information from the controller (22) of the charging device (20); and after the controller (22) of the charging device (20) receives the signal transmitted via the near-field communication from the temporarily connected controller (12) of the power storage pack (10), collating, by the controller (22) of the charging device (20), whether or not the identification information included in the received signal matches the identification information wiredly received, and authenticating that the power storage pack (10)

mounted in the charging slot (SLc1) is identical to a partner device communicating via the near-field communication when the identification information included in the received signal matches the identification information wiredly received.

Controller (22) of charging device (20) accurately authenticates whether or not the partner device communicating via the near-field communication is identical to power storage pack (10) mounted in charging slot (SLc1).

Item 6

The power storage pack authentication method according to item 5, further includes: after a power storage pack (10) detached from another charging slot (SLc2) of the charging device (20) is mounted in the electric movable body (30), transmitting via the near-field communication, by the controller (12) of the power storage pack (10), the signal notifying of a presence of the power storage pack (10); after a controller (32) of the electric movable body (30) receives the signal transmitted via the near-field communication, temporarily connecting the controller (32) of the electric movable body (30) with the controller which has transmitted the received signal; wiredly transmitting, by the controller (32) of the electric movable body (30), identification information to the controller (12) of the power storage pack (10) mounted in the electric movable body (30); after the temporarily connected controller (12) of the power storage pack (10) wiredly receives the identification information from the controller (32) of the electric movable body (30), transmitting via the near-field communication, by the temporarily connected controller (12) of the power storage pack (10), a signal including the identification information received from the controller (32) of the electric movable body (30) to the controller (32) of the electric movable body (30); and after the controller (32) of the electric movable body (30) receives the signal transmitted via the near-field communication from the temporarily connected controller (12) of the power storage pack (10), collating, by the controller (32) of the electric movable body (30), whether or not the identification information included in the received signal matches the identification information wiredly transmitted, and authenticating that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 7

The power storage pack authentication method according to item 6, further includes: turning on a mounting permission flag retained in the power storage pack (10) after the controller (22) of the charging device (20) authenticates that the power storage pack (10) mounted in the charging slot (SLc1) is identical to the partner device communicating via the near-field communication; and turning off the mounting permission flag retained in the power storage pack (10) after the controller (32) of the electric movable body (30) authenticates that the power storage pack (10) mounted in the electric movable body (30) is identical to the partner device communicating via the near-field communication.

It is possible to prevent the use of power storage pack (10) acquired by unauthorized means.

Item 8

A power storage pack authentication method includes: after a power storage pack (10) detached from a charging slot (SLc1) of a charging device (20) is mounted in an electric movable body (30), transmitting via near-field communication, by the controller (12) of the power storage pack (10), a signal notifying of a presence of the power storage pack (10); after receiving the signal transmitted via the near-field communication, temporarily connecting a controller (32) of the electric movable body (30) with the controller which has transmitted the received signal; wiredly transmitting, by the controller (32) of the electric movable body (30), identification information to the controller (12) of the power storage pack (10) mounted in the electric movable body (30); after the temporarily connected controller (12) of the power storage pack (10) wiredly receives the identification information from the controller (32) of the electric movable body (30), transmitting via the near-field communication, by the temporarily connected controller (12) of the power storage pack (10), a signal including the identification information received from the controller (32) of the electric movable body (30) to the controller (32) of the electric movable body (30); and after the controller (32) of the electric movable body (30) receives the signal transmitted from the temporarily connected controller (12) of the power storage pack (10) via the near-field communication, collating, by the controller (32) of the electric movable body (30), whether or not the identification information included in the received signal matches the identification information wiredly transmitted, and authenticating that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 9

In the power storage pack authentication method according to any one of items 1 to 8, the near-field communication is Bluetooth® Low Energy (BLE).

The near-field communication can be performed with low power consumption.

Item 10

A power storage pack (10) includes: a power storage unit (11) configured to supply electric power to an electric movable body (30); and a controller (12) configured to communicate with a controller (32) of the electric movable body (30) and a controller (22) of a charging device (20). The controller (12) of the power storage pack (10) is configured to: after the power storage pack (10) is detached from the electric movable body (30) and is mounted in a charging slot (SLc1) of the charging device (20), receive identification information from the controller (22) of the charging device (20); and transmit via near-field communication a signal including the identification information received from the charging device (20). The signal transmitted via the near-field communication is utilized for the controller (22) of the charging device (20) to authenticate whether or not the power storage pack (10) mounted in the charging slot (SLc1) is identical to a partner device communicating via the near-field communication.

Controller (22) of charging device (20) accurately authenticates whether or not the partner device communicating via the near-field communication is identical to power storage pack (10) mounted in charging slot (SLc1).

Item 11

In the power storage pack according to item 10, the controller (12) of the power storage pack (10) is configured to: wiredly receive another identification information from the controller (32) of the electric movable body (30) after the power storage pack (10) is detached from the charging slot (SLc1) and is mounted in the electric movable body (30); and transmit via the near-field communication a signal including the another identification information received from the electric movable body (30). The signal transmitted via the near-field communication is utilized for the controller (32) of the electric movable body (30) to authenticate whether or not the power storage pack (10) mounted in the electric movable body (30) is identical to a partner device communicating via the near-field communication.

Controller (32) of electric movable body (30) accurately authenticates whether or not mounted power storage pack (10) is identical to the partner device communicating via the near-field communication.

Item 12

A power storage pack (10) includes: a power storage unit (11) configured to supply electric power to an electric movable body (30); and a controller (12) configured to communicate with a controller (32) of the electric movable body (30) and a controller (22) of a charging device (20). The controller (12) of the power storage pack (10) is configured to: wiredly receive identification information from the controller (32) of the electric movable body (30) after the power storage pack (10) is detached from a charging slot (SLc1) of the charging device (20) and is mounted in the electric movable body (30); and transmit via near-field communication a signal including the identification information received from the electric movable body (30). The signal transmitted via the near-field communication is utilized for the controller (32) of the electric movable body (30) to authenticate whether or not the power storage pack (10) mounted in the electric movable body (30) is identical to the partner device communicating via the near-field communication.

Controller (32) of electric movable body (30) accurately authenticates whether or not mounted power storage pack (10) is identical to the partner device communicating via the near-field communication.

Item 13

A power storage pack (10) includes: a power storage unit (11) configured to supply electric power to an electric movable body (30); and a controller (12) configured to communicate with a controller (32) of the electric movable body (30) and a controller (22) of a charging device (20). The controller (12) of the power storage pack (10) is configured to: transmit via near-field communication a signal notifying of a presence of the power storage pack (10) after the power storage pack (10) is detached from the electric movable body (30) and is mounted in a charging slot (SLc1) of the charging device (20); receive identification information from the controller (22) of the charging device (20) after being temporarily connected with the controller (22) of the charging device (20); and after wiredly receiving the identification information from the controller (22) of the charging device (20), transmit via the near-field communication a signal including the identification information received from the controller (22) of the charging device (20) to the controller (22) of the charging device (20). The signal transmitted via the near-field communication is utilized for the controller (22) of the charging device (20) to authenticate whether or not the power storage pack (10) mounted in the charging device (20) is identical to a partner device communicating via the near-field communication.

Controller (22) of charging device (20) accurately authenticates whether or not the partner device communicating via the near-field communication is identical to power storage pack (10) mounted in charging slot (SLc1).

Item 14

In the power storage pack (10) according to item 13, the controller (12) of the power storage pack (10) is configured to: transmit via the near-field communication the signal notifying of a presence of the power storage pack (10) after the power storage pack (10) is detached from the charging slot (SLc1) and is mounted in the electric movable body (30); wiredly receive identification information from the controller (32) of the electric movable body (30) after being temporarily connected to the controller (32) of the electric movable body (30); and after wiredly receiving the identification information from the controller (32) of the electric movable body (30), transmit via the near-field communication a signal including the identification information received from the controller (32) of the electric movable body (30) to the controller (32) of the electric movable body (30). The signal transmitted via the near-field communication is utilized for the controller (32) of the electric movable body (30) to authenticate whether or not the power storage pack (10) mounted in the electric movable body (30) is identical to a partner device communicating via the near-field communication.

Controller (32) of electric movable body (30) accurately authenticates whether or not mounted power storage pack (10) is identical to the partner device communicating via the near-field communication.

Item 15

A power storage pack (10) includes: a power storage unit (11) configured to supply electric power to an electric movable body (30); and a controller (12) configured to communicate with a controller (32) of the electric movable body (30) and a controller (22) of a charging device (20). The controller (12) of the power storage pack (10) is configured to: transmits via near-field communication a signal notifying of a presence of the power storage pack (10) after the power storage pack (10) is detached from a charging slot (SLc1) of the charging device (20) and is mounted in the electric movable body (30); wiredly receive identification information from the controller (32) of the electric movable body (30) after being temporarily connected with the controller (32) of the electric movable body (30); and after wiredly receiving the identification information from the controller (32) of the electric movable body (30), transmit via the near-field communication a signal including the identification information received from the controller (32) of the electric movable body (30) to the controller (32) of the electric movable body (30). The signal transmitted via the near-field communication is utilized for the controller (32) of the electric movable body (30) to authenticate whether or not the power storage pack (10) mounted in the electric movable body (30) is identical to a partner device communicating via the near-field communication.

Controller (32) of electric movable body (30) authenticates whether or not mounted power storage pack (10) is identical to the partner device communicating via the near-field communication.

Item 16

A charging device (20) includes: a charging slot (SLc1); and a controller (22) configured to communicate with a controller (12) of a power storage pack (10). The controller (22) of the charging device (20) is configured to: wiredly transmit identification information to the controller (12) of the power storage pack (10) mounted in the charging slot (SLc1) after the power storage pack (10) detached from an electric movable body (30) is mounted in the charging slot (SLc1); after receiving a signal transmitted via near-field communication, collate whether or not identification information included in the received signal matches the identification information wiredly transmitted, and authenticate that the power storage pack (10) mounted in the charging slot (SLc1) is identical to a partner device communicating via the near-field communication when the identification information included in the received signal matches the identification information wiredly transmitted.

Controller (22) of charging device (20) accurately authenticates whether or not the partner device communicating via the near-field communication is identical to power storage pack (10) mounted in charging slot (SLc1).

Item 17

A charging device (20) includes: a charging slot (SLc1); and a controller (22) configured to communicate with a controller (12) of a power storage pack (10). The controller (22) of the charging device (20) is configured to: after receiving a signal transmitted via near-field communication after the power storage pack (10) is mounted in the charging slot (SLc1), temporarily connect the controller (22) of the charging device (20) to a controller which has transmitted the received signal; wiredly transmit identification information to the controller (12) of the power storage pack (10) mounted in the charging slot (SLc1); and after receiving a signal transmitted via the near-field communication from the temporarily connected controller (12) of the power storage pack (10), collates whether or not the identification information included in the received signal matches the identification information wiredly transmitted, and authenticate that the power storage pack (10) mounted in the charging slot (SLc1) is identical to a partner device communicating via the near-field communication when the identification information included in the received signal matches the identification information wiredly transmitted.

Controller (22) of charging device (20) accurately authenticates whether or not the partner device communicating via the near-field communication is identical to power storage pack (10) mounted in charging slot (SLc1).

Item 18

An electric movable body (30) includes: a motor (311); and a controller (32) configured to communicate with a controller (22) of a power storage pack (10). The controller (32) of the electric movable body (30) is configured to: after the power storage pack (10) detached from a charging slot (SLc1) of a charging device (20) is mounted in the electric movable body (30), wiredly transmit identification information to the controller (12) of the power storage pack (10) mounted in the electric movable body (30); and after receiving a signal transmitted via near-field communication, collate whether or not identification information included in the received signal matches the identification information wiredly transmitted, and authenticate that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 19

An electric movable body (30) includes; a motor (311); and a controller (32) configured to communicate with a controller (12) of a power storage pack (10). The controller (32) of the electric movable body (30) is configured to: after receiving a signal transmitted via near-field communication after the power storage pack (10) is mounted in the electric movable body (30), temporarily connecting the controller (32) of the electric movable body (30) a controller which has transmitted the received signal; wiredly transmit identification information to the controller (12) of the power storage pack (10) mounted in the electric movable body (30); and after receiving a signal transmitted via the near-field communication from the temporarily connected controller (12) of the power storage pack (10), collate identification information included in the received signal matches the identification information wiredly transmitted, and authenticate that the power storage pack (10) mounted in the electric movable body (30) is identical to a partner device communicating via the near-field communication when the identification information included in the received signal matches the identification information wiredly transmitted.

Controller (32) of electric movable body (30) accurately authenticates whether or not mounted power storage pack (10) is identical to the partner device communicating via the near-field communication.

Item 20

A controller (32) of an electric movable body (30) is configured to: wiredly transmit identification information to a controller (12) of a power storage pack (10) mounted in the electric movable body (30) after the power storage pack (10) detached from a charging slot (SLc1) of a charging device (20) is mounted in the electric movable body (30); after receiving a signal transmitted via near-field communication, collate whether or not identification information included in the received signal matches the identification information wiredly transmitted, and authenticate that the power storage pack (10) mounted in the electric movable body (30) is identical to a partner device communicating via the near-field communication when the identification information included in the received signal matches the identification information wiredly transmitted.

The controller of the electric movable body (30) accurately authenticates whether or not power storage pack (10) mounted in electric movable body (30) is identical to the partner device communicating via the near-field communication.

Item 21

A controller (32) of an electric movable body (30) is configured to: after receiving a signal transmitted via near-field communication after a power storage pack (10) is mounted in the electric movable body (30), temporarily connect the controller (32) of the electric movable body (30) to a controller which has transmitted the received signal; wiredly transmit identification information to a controller (12) of the power storage pack (10) mounted in the electric movable; after receiving a signal transmitted via the near-field received from the temporarily connected controller (12) of the power storage pack (10), collate whether or not identification information included in the received signal matches the identification information wiredly transmitted, and authenticates that the power storage pack (10) mounted in the electric movable body (30) is identical to a partner device communicating the near-field communication when the identification information included in the received signal matches the identification information wiredly transmitted.

The controller of the electric movable body accurately authenticates whether or not power storage pack (10) mounted in electric movable body (30) is identical to the partner device communicating via the near-field communication.

REFERENCE MARKS IN THE DRAWINGS 1 vehicle system
2 commercial power system
10 battery pack
11 battery module
E1-En cell
12 battery controller
13 processing unit
14 voltage measurement unit
15 antenna
16 wireless communication unit
17 current sensor
18 fitting detection unit
20 charging device
21 charging stand
SLc charging slot
22 controller
23 processing unit
25 antenna
26 wireless communication unit
27 display unit
28 operation unit
29 charging unit
30 vehicle
31 battery mounting unit
SLa mounting slot
32 vehicle controller
33 processing unit
34 relay controller
35 antenna
36 wireless communication unit
37 pack detection unit
38 fitting detection unit
39 meter panel
310 inverter
311 motor
312 tire
RYm main relay
RYsa first slot relay
RYsb second slot relay
RYp power relay
RYc pack-side communication relay
RYca first vehicle-side communication relay
RYcb second vehicle-side communication relay
RYd discharge relay
F1, F2 fuse
R1, R2 resistor
Tp positive-electrode terminal
Tm negative-electrode terminal

The invention claimed is:

1. A power storage pack authentication method comprising:
after a power storage pack detached from an electric movable body is mounted in a charging slot of a charging device, wiredly transmitting, by the controller of the charging device, identification information to a controller of the power storage pack mounted in the charging slot of the charging device;
transmitting via near-field communication, by the controller of the power storage pack, a signal including the identification information received from the charging device; and
after the controller of the charging device receives the signal transmitted via the near-field communication, collating, by the controller of the charging device, whether or not the identification information included in the received signal matches the identification information transmitted wiredly, and authenticate that the power storage pack mounted in the charging slot is identical to a partner device communicating via the near-field communication when the identification information included in the received signal matches the identification information wiredly transmitted.

2. The power storage pack authentication method according to claim 1, further comprising:
wiredly transmitting, by a controller of the electric movable body, identification information to the controller of the power storage pack mounted in the electric movable body when the power storage pack is detached from another charging slot of the charging device and is mounted in the electric movable body;
transmitting via the near-field communication, by the controller of the power storage pack, a signal including the identification information received from the electric movable body; and
after the controller of the electric movable body receives the signal transmitted via the near-field communication, collating, by the controller of the electric movable body, whether or not the identification information included in the received signal matches the identification information wiredly transmitted, and authenticating that the power storage pack mounted in the electric movable body is identical to a partner device communicating via the near-field communication when the identification information included in the received signal matches the identification information wiredly transmitted.

3. The power storage pack authentication method according to claim 2, further comprising:
turning on, by the controller of the charging device, a mounting permission flag retained in the power storage pack after authenticating that the power storage pack mounted in the charging slot is identical to the communication partner of the near-field communication; and turning off, by the controller of the electric movable body, the mounting permission flag retained in the power storage pack after authenticating that the power storage pack mounted in the electric movable body is identical to the communication partner of the near-field communication.

4. A power storage pack authentication method comprising:

wiredly transmitting, by a controller of an electric movable body, identification information to a controller of a power storage pack after the power storage pack is mounted in the electric movable body;

transmitting via near-field communication, by the controller of the power storage pack, a signal including the identification information received from the electric movable body; and after the controller of the electric movable body receives the signal transmitted via the near-field communication, collating, by the controller of the electric movable body, whether or not the identification information included in the received signal matches the identification information wiredly transmitted, and authenticating that the power storage pack mounted in the electric movable body is identical to a partner device communicating via the near-field communication when the identification information included in the received signal matches the identification information wiredly transmitted.

5. A power storage pack authentication method comprising:

after a power storage pack detached from an electric movable body is mounted in a charging slot of a charging device, transmitting via near-field communication, by a controller of the power storage pack, a signal notifying of a presence of the power storage pack;

after the controller of the charging device receives the signal transmitted via the near-field communication, temporarily connecting the controller of the charging device to the controller which has transmitted the received signal;

wiredly transmitting, by the controller of the charging device, identification information to the controller of the power storage pack mounted in the charging slot;

transmitting via the near-field communication, by the temporarily connected controller of the power storage pack, a signal including the identification information received from the controller of the charging device to the controller of the charging device after wiredly receiving the identification information from the controller of the charging device; and after the controller of the charging device receives the signal transmitted via the near-field communication from the temporarily connected controller of the power storage pack, collating, by the controller of the charging device, whether or not the identification information included in the received signal matches the identification information wiredly received, and authenticating that the power storage pack mounted in the charging slot is identical to a partner device communicating via the near-field communication when the identification information included in the received signal matches the identification information wiredly received.

6. The power storage pack authentication method according to claim 5, further comprising:

after a power storage pack detached from another charging slot of the charging device is mounted in the electric movable body, transmitting via the near-field communication, by the controller of the power storage pack, the signal notifying of a presence of the power storage pack;

after a controller of the electric movable body receives the signal transmitted via the near-field communication, temporarily connecting the controller of the electric movable body with the controller which has transmitted the received signal;

wiredly transmitting, by the controller of the electric movable body, identification information to the controller of the power storage pack mounted in the electric movable body;

after the temporarily connected controller of the power storage pack wiredly receives the identification information from the controller of the electric movable body, transmitting via the near-field communication, by the temporarily connected controller of the power storage pack, a signal including the identification information received from the controller of the electric movable body to the controller of the electric movable body; and after the controller of the electric movable body receives the signal transmitted via the near-field communication from the temporarily connected controller of the power storage pack, collating, by the controller of the electric movable body, whether or not the identification information included in the received signal matches the identification information wiredly transmitted, and authenticating that the power storage pack mounted in the electric movable body is identical to a partner device communicating via the near-field communication when the identification information included in the received signal matches the identification information wiredly transmitted.

7. The power storage pack authentication method according to claim 6, further comprising:

turning on a mounting permission flag retained in the power storage pack after the controller of the charging device authenticates that the power storage pack mounted in the charging slot is identical to the partner device communicating via the near-field communication; and turning off the mounting permission flag retained in the power storage pack after the controller of the electric movable body authenticates that the power storage pack mounted in the electric movable body is identical to the partner device communicating via the near-field communication.

8. A power storage pack authentication method comprising:

after a power storage pack detached from a charging slot of a charging device is mounted in an electric movable body, transmitting via near-field communication, by the controller of the power storage pack, a signal notifying of a presence of the power storage pack;

after receiving the signal transmitted via the near-field communication, temporarily connecting a controller of the electric movable body with the controller which has transmitted the received signal;

wiredly transmitting, by the controller of the electric movable body, identification information to the controller of the power storage pack mounted in the electric movable body;

after the temporarily connected controller of the power storage pack wiredly receives the identification information from the controller of the electric movable body, transmitting via the near-field communication, by the temporarily connected controller of the power storage pack, a signal including the identification information received from the controller of the electric movable body to the controller of the electric movable body; and after the controller of the electric movable body receives the signal transmitted from the temporarily connected controller of the power storage pack via the near-field communication, collating, by the controller of the electric movable body, whether or not the identification information included in the received signal matches the identification information wiredly transmitted, and authenticating that the power storage pack mounted in the electric movable body is identical to a partner device communicating via the near-field communication when the identification information included in the received signal matches the identification information wiredly transmitted.

9. The power storage pack authentication method according to claim 1, wherein the near-field communication is Bluetooth® Low Energy (BLE).

10. A power storage pack comprising:
a power storage unit configured to supply electric power to an electric movable body; and
a controller configured to communicate with a controller of the electric movable body and a controller of a charging device, wherein
the controller of the power storage pack is configured to:
after the power storage pack is detached from the electric movable body and is mounted in a charging slot of the charging device, receive identification information from the controller of the charging device; and
transmit via near-field communication a signal including the identification information received from the charging device, and
the signal transmitted via the near-field communication is utilized for the controller of the charging device to authenticate whether or not the power storage pack mounted in the charging slot is identical to a partner device communicating via the near-field communication.

11. The power storage pack according to claim 10, wherein
the controller of the power storage pack is configured to:
wiredly receive another identification information from the controller of the electric movable body after the power storage pack is detached from the charging slot and is mounted in the electric movable body; and
transmit via the near-field communication a signal including the another identification information received from the electric movable body, and
the signal transmitted via the near-field communication is utilized for the controller of the electric movable body to authenticate whether or not the power storage pack mounted in the electric movable body is identical to a partner device communicating via the near-field communication.

12. A power storage pack comprising:
a power storage unit configured to supply electric power to an electric movable body; and
a controller configured to communicate with a controller of the electric movable body and a controller of a charging device, wherein
the controller of the power storage pack is configured to:
wiredly receive identification information from the controller of the electric movable body after the power storage pack is detached from a charging slot of the charging device and is mounted in the electric movable body; and
transmit via near-field communication a signal including the identification information received from the electric movable body, and
the signal transmitted via the near-field communication is utilized for the controller of the electric movable body to authenticate whether or not the power storage pack mounted in the electric movable body is identical to the partner device communicating via the near-field communication.

13. A power storage pack comprising:
a power storage unit configured to supply electric power to an electric movable body; and
a controller configured to communicate with a controller of the electric movable body and a controller of a charging device, wherein
the controller of the power storage pack is configured to:
transmit via near-field communication a signal notifying of a presence of the power storage pack after the power storage pack is detached from the electric movable body and is mounted in a charging slot of the charging device;
receive identification information from the controller of the charging device after being temporarily connected with the controller of the charging device; and
after wiredly receiving the identification information from the controller of the charging device, transmit via the near-field communication a signal including the identification information received from the controller of the charging device to the controller of the charging device, and
the signal transmitted via the near-field communication is utilized for the controller of the charging device to authenticate whether or not the power storage pack mounted in the charging device is identical to a partner device communicating via the near-field communication.

14. The power storage pack according to claim 13, wherein
the controller of the power storage pack is configured to:
transmit via the near-field communication the signal notifying of a presence of the power storage pack after the power storage pack is detached from the charging slot and is mounted in the electric movable body;
wiredly receive identification information from the controller of the electric movable body after being temporarily connected to the controller of the electric movable body; and
after wiredly receiving the identification information from the controller of the electric movable body, transmit via the near-field communication a signal including the identification information received from the controller of the electric movable body to the controller of the electric movable body, and
the signal transmitted via the near-field communication is utilized for the controller of the electric movable body to authenticate whether or not the power storage pack mounted in the electric movable body is identical to a partner device communicating via the near-field communication.

15. A power storage pack comprising:
a power storage unit configured to supply electric power to an electric movable body; and
a controller configured to communicate with a controller of the electric movable body and a controller of a charging device, wherein
the controller of the power storage pack is configured to:
   transmits via near-field communication a signal notifying of a presence of the power storage pack after the power storage pack is detached from a charging slot of the charging device and is mounted in the electric movable body;
   wiredly receive identification information from the controller of the electric movable body after being temporarily connected with the controller of the electric movable body; and
   after wiredly receiving the identification information from the controller of the electric movable body, transmit via the near-field communication a signal including the identification information received from the controller of the electric movable body to the controller of the electric movable body, and
the signal transmitted via the near-field communication is utilized for the controller of the electric movable body to authenticate whether or not the power storage pack mounted in the electric movable body is identical to a partner device communicating via the near-field communication.

16. A charging device comprising:
a charging slot; and
a controller configured to communicate with a controller of a power storage pack, wherein
the controller of the charging device is configured to:
   wiredly transmit identification information to the controller of the power storage pack mounted in the charging slot after the power storage pack detached from an electric movable body is mounted in the charging slot;
   after receiving a signal transmitted via near-field communication, collate whether or not identification information included in the received signal matches the identification information wiredly transmitted, and authenticate that the power storage pack mounted in the charging slot is identical to a partner device communicating via the near-field communication when the identification information included in the received signal matches the identification information wiredly transmitted.

17. A charging device comprising:
a charging slot; and
a controller configured to communicate with a controller of a power storage pack, wherein
the controller of the charging device is configured to:
   after receiving a signal transmitted via near-field communication after the power storage pack is mounted in the charging slot, temporarily connect the controller of the charging device to a controller which has transmitted the received signal;
   wiredly transmit identification information to the controller of the power storage pack mounted in the charging slot; and
   after receiving a signal transmitted via the near-field communication from the temporarily connected controller of the power storage pack, collates whether or not the identification information included in the received signal matches the identification information wiredly transmitted, and authenticate that the power storage pack mounted in the charging slot is identical to a partner device communicating via the near-field communication when the identification information included in the received signal matches the identification information wiredly transmitted.

18. An electric movable body comprising:
a motor; and
a controller configured to communicate with a controller of a power storage pack, wherein
the controller of the electric movable body is configured to:
   after the power storage pack detached from a charging slot of a charging device is mounted in the electric movable body, wiredly transmit identification information to the controller of the power storage pack mounted in the electric movable body; and
   after receiving a signal transmitted via near-field communication, collate whether or not identification information included in the received signal matches the identification information wiredly transmitted, and authenticate that the power storage pack mounted in the electric movable body is identical to a partner device communicating via the near-field communication when the identification information included in the received signal matches the identification information wiredly transmitted.

19. An electric movable body comprising;
a motor; and
a controller configured to communicate with a controller of a power storage pack, wherein
the controller of the electric movable body is configured to:
   after receiving a signal transmitted via near-field communication after the power storage pack is mounted in the electric movable body, temporarily connecting the controller of the electric movable body a controller which has transmitted the received signal;
   wiredly transmit identification information to the controller of the power storage pack mounted in the electric movable body; and
   after receiving a signal transmitted via the near-field communication from the temporarily connected controller of the power storage pack, collate identification information included in the received signal matches the identification information wiredly transmitted, and authenticate that the power storage pack mounted in the electric movable body is identical to a partner device communicating via the near-field communication when the identification information included in the received signal matches the identification information wiredly transmitted.

20. A controller of an electric movable body, wherein the controller of the electric movable body is configured to:
   wiredly transmit identification information to a controller of a power storage pack mounted in the electric movable body after the power storage pack detached from a charging slot of a charging device is mounted in the electric movable body;
   after receiving a signal transmitted via near-field communication, collate whether or not identification information included in the received signal matches the identification information wiredly transmitted, and authenticate that the power storage pack mounted in the electric movable body is identical to a partner device communicating via the near-field communication when the identification information included in the received signal matches the identification information wiredly transmitted.

21. A controller of an electric movable body, wherein the controller of the electric movable body is configured to:

after receiving a signal transmitted via near-field communication after a power storage pack is mounted in the electric movable body, temporarily connect the controller of the electric movable body to a controller which has transmitted the received signal;

wiredly transmit identification information to a controller of the power storage pack mounted in the electric movable;

after receiving a signal transmitted via the near-field received from the temporarily connected controller of the power storage pack, collate whether or not identification information included in the received signal matches the identification information wiredly transmitted, and authenticates that the power storage pack mounted in the electric movable body is identical to a partner device communicating the near-field communication when the identification information included in the received signal matches the identification information wiredly transmitted.

* * * * *